US008355973B2

(12) United States Patent
Geller et al.

(10) Patent No.: US 8,355,973 B2
(45) Date of Patent: Jan. 15, 2013

(54) APPARATUSES, METHODS AND SYSTEMS FOR A PERIODIC AUCTION RESET SECURITIES OPTIMIZATION ENGINE

(75) Inventors: Viktor Geller, Brooklyn, NY (US); Joanne Howard, Woodbury, NY (US); Brett Colaiacovo, Hackensack, NJ (US); Daniel Cohen, New York City, NY (US); Jodi-Lynn Weber, New York City, NY (US); Aaron Heller, Elizabeth, NJ (US); Seva Zaslavsky, Maplewood, NJ (US)

(73) Assignee: Goldman, Sachs & Co., New York, NY (US)

( * ) Notice: Subject to any disclaimer, the term of this patent is extended or adjusted under 35 U.S.C. 154(b) by 548 days.

(21) Appl. No.: 12/363,771

(22) Filed: Feb. 1, 2009

(65) Prior Publication Data
US 2009/0254489 A1 Oct. 8, 2009

Related U.S. Application Data

(60) Provisional application No. 61/025,613, filed on Feb. 1, 2008.

(51) Int. Cl.
*G06Q 40/00* (2012.01)
(52) U.S. Cl. ...................................... 705/36 R; 705/35
(58) Field of Classification Search .................. 705/36 R, 705/35
See application file for complete search history.

(56) References Cited

U.S. PATENT DOCUMENTS

| | | | |
|---|---|---|---|
| 7,617,148 B2 * | 11/2009 | Breslow et al. | 705/37 |
| 7,668,947 B2 * | 2/2010 | Hutchinson et al. | 709/223 |
| 7,707,093 B2 * | 4/2010 | O'Shaughnessy et al. | 705/36 R |

OTHER PUBLICATIONS

Credit Markets; Tucson Electric Seeks Lower Rate. (Oct. 3, 1991). New York Times (Late Edition (east Coast)), p. D.16. Retrieved Aug. 7, 2012.*

* cited by examiner

*Primary Examiner* — Kito R Robinson
(74) *Attorney, Agent, or Firm* — Perkins Coie LLP

(57) ABSTRACT

Dynamic management of one or more portfolios of securities, in particular, portfolios of Periodic Auction Reset Securities (PARS) is disclosed. The dynamic management for the specification of rules for investor accounts by which optimization of this type of portfolio may occur and allows financial institutions or other wealth management entities to easily maintain and invest in PARS holdings for multiple accounts. For example, the dynamic management systems and methods can provide for the maintenance of a large number of separate accounts that contain PARS, centralize the maintenance of PARS positions, allow management of central PARS accounts in line with guidelines specified in one or more account profiles, allow sales traders to specify additional guidelines, and/or automate account analysis, trade generation and/or participation in the auction process.

19 Claims, 25 Drawing Sheets

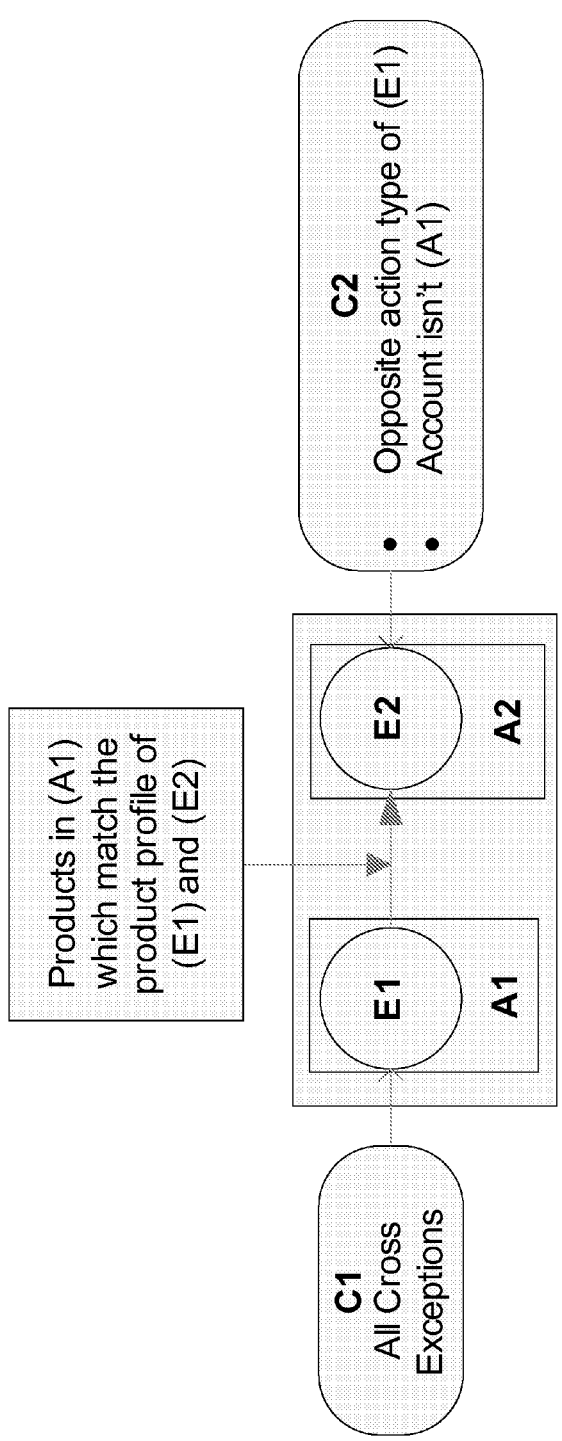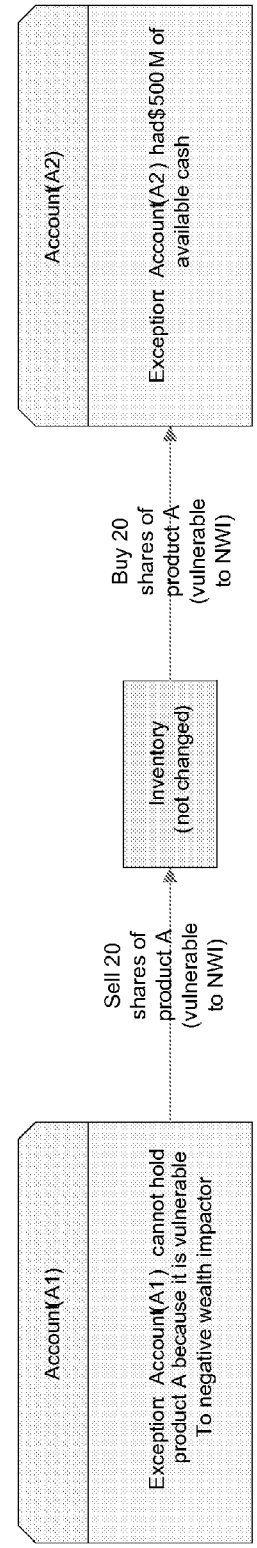
Figure 5A
Figure 5B

Sweep Rate Spread (Central Manager)

Auction Date: 16-Nov

AAA Rated Sweep Vehicles
10 10
Set default spread [ ] basis points above the cash sweep rate.

| | NY | MA | CA | NJ | NT |
|---|---|---|---|---|---|
| Daily | | | | | |
| Weekly | | | | | |
| Monthly | | | | | |

Non-AAA Rated Sweep Vehicles
Set default spread [ ] basis points above the cash sweep rate.
10 20

| | NY | MA | CA | NJ | NT |
|---|---|---|---|---|---|
| Daily | | | | | |
| Weekly | | | | | |
| Monthly | | | | | |

Save

APPARATUSES, METHODS AND SYSTEMS FOR A PERIODIC AUCTION RESET SECURITIES OPTIMIZATION ENGINE

RELATED APPLICATIONS

Applicant hereby claims priority under 35 USC §119(e) to U.S. Provisional Patent Application Ser. No. 61/025,613 filed Feb. 1, 2008, entitled "APPARATUSES, METHODS AND SYSTEMS FOR A PERIODIC AUCTION RESET SECURITIES OPTIMIZATION ENGINE,". The entire contents of the aforementioned application is herein expressly incorporated by reference.

FIELD

The present invention is directed generally to an apparatuses, methods, and systems for optimization, and more particularly, to APPARATUSES, METHODS AND SYSTEMS FOR A PERIODIC AUCTION RESET SECURITIES OPTIMIZATION ENGINE (hereinafter "OPTIMIZER").

BACKGROUND

A security is a negotiable instrument representing financial value and functioning as proof that an investor has invested money in an organization's equity or debt. Securities may be categorized into debt securities (e.g., banknotes, bonds, debentures and the like) and equity securities (e.g., common stocks and the like). The entity issuing the security is called the issuer.

Municipal securities are debt securities, issued by government entities (e.g., local and/or state governments) and/or agencies or other authorities established by governing entities. Municipal securities may be used to fund infrastructure, schools, other municipal improvements or expenses, and/or the like.

SUMMARY

This disclosure details APPARATUSES, METHODS AND SYSTEMS FOR A PERIODIC AUCTION RESET SECURITIES OPTIMIZATION ENGINE (hereinafter "OPTIMIZER") that delivers dynamic management of securities and/or the like. In particular, this disclosure discusses the application of the OPTIMIZER to management of a portfolio of Periodic Auction Reset Securities (PARS), a type of long-term variable rate municipal bond. The OPTIMIZER allows for the specification of rules for investor accounts by which optimization of this type of asset and/or portfolio thereof may occur.

In some embodiments, the OPTIMIZER allows financial institutions or other wealth management entities to easily maintain and invest in PARS holdings for multiple accounts. In one embodiment, each may have different profiles and/or holdings. In one implementation, the OPTIMIZER provides for the maintenance of a large number of separate accounts that contain only PARS. Under traditional methods, PARS position maintenance (e.g., bidding at auctions) could be labor intensive. In one embodiment, the OPTIMIZER centralizes the maintenance of PARS positions. Depending on the implementation, the OPTIMIZER may reduce required maintenance efforts/labor of PARS holdings.

In one embodiment, the disclosed OPTIMIZER allows management of central PARS accounts in line with guidelines specified in an account profile, where a profile may be specific to each client, allowing for greater client customization. In a further embodiment, the OPTIMIZER may allow Private Wealth Management (PWM) team managers and/or the like to specify additional guidelines. In some embodiments, the OPTIMIZER automates account analysis, trade generation and/or participation in the auction process. As such, the OPTIMIZER may create additional bandwidth for sales traders.

In one embodiment, the OPTIMIZER may implement optimization rules. In one implementation, optimization rules may consist of two types: 1) account rules that validate accounts, and 2) action rules that validate proposed OPTIMIZER transactions. Each rule may have a score, a collection of possible action types, and a collection of possible settlement types. The OPTIMIZER may create an exception as a result of a violation of a rule and the higher a rule's score, the more severe the exception will be. Each exception may also have a collection of possible action types and settlement types. It should be noted that the OPTIMIZER may discern that some exceptions are more critical than others, and may allow for different levels of exceptions and appropriate enhancement of processing flow based on various levels of critically. In one embodiment, the OPTIMIZER suggests actions (e.g., trades or orders) in trying to resolve exceptions, each of which is associated with a score. The OPTIMIZER may thus be configured to minimize the total score of all exceptions in each client account.

BRIEF DESCRIPTION OF THE DRAWINGS

The accompanying appendices and/or drawings illustrate various non-limiting, example, inventive aspects in accordance with the present disclosure:

FIGS. 5A and 5B provide detail for a cross component in one embodiment of the OPTIMIZER;

FIG. 7 is an example screen image illustrating aspects of an account profile user interface for an embodiment of the OPTIMIZER;

FIGS. 8A and 8B provide example screen images illustrating aspects of an account dashboard user interface for an embodiment of the OPTIMIZER;

FIG. 10 is an example screen image illustrating aspects of a sweep rate spread user interface for an embodiment of the OPTIMIZER;

FIG. 11 is an example screen image illustrating aspects of an auction calendar user interface for an embodiment of the OPTIMIZER;

FIG. 12 is an example screen image illustrating aspects of an auction orders user interface for an embodiment of the OPTIMIZER;

FIG. 13 is an example screen image illustrating aspects of a liquidity request dashboard user interface for an embodiment of the OPTIMIZER;

Figure 14A:
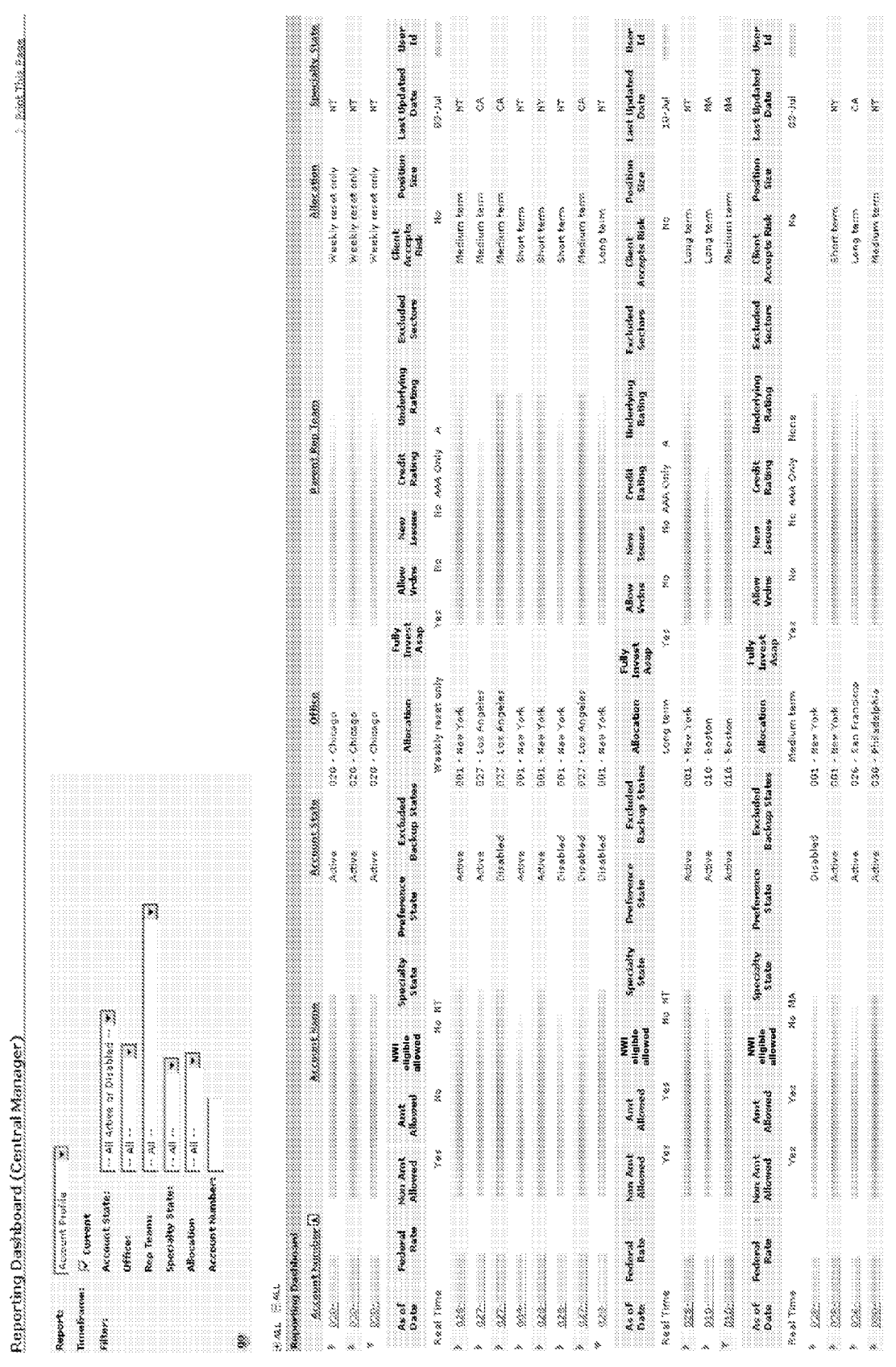
Figure 14D:
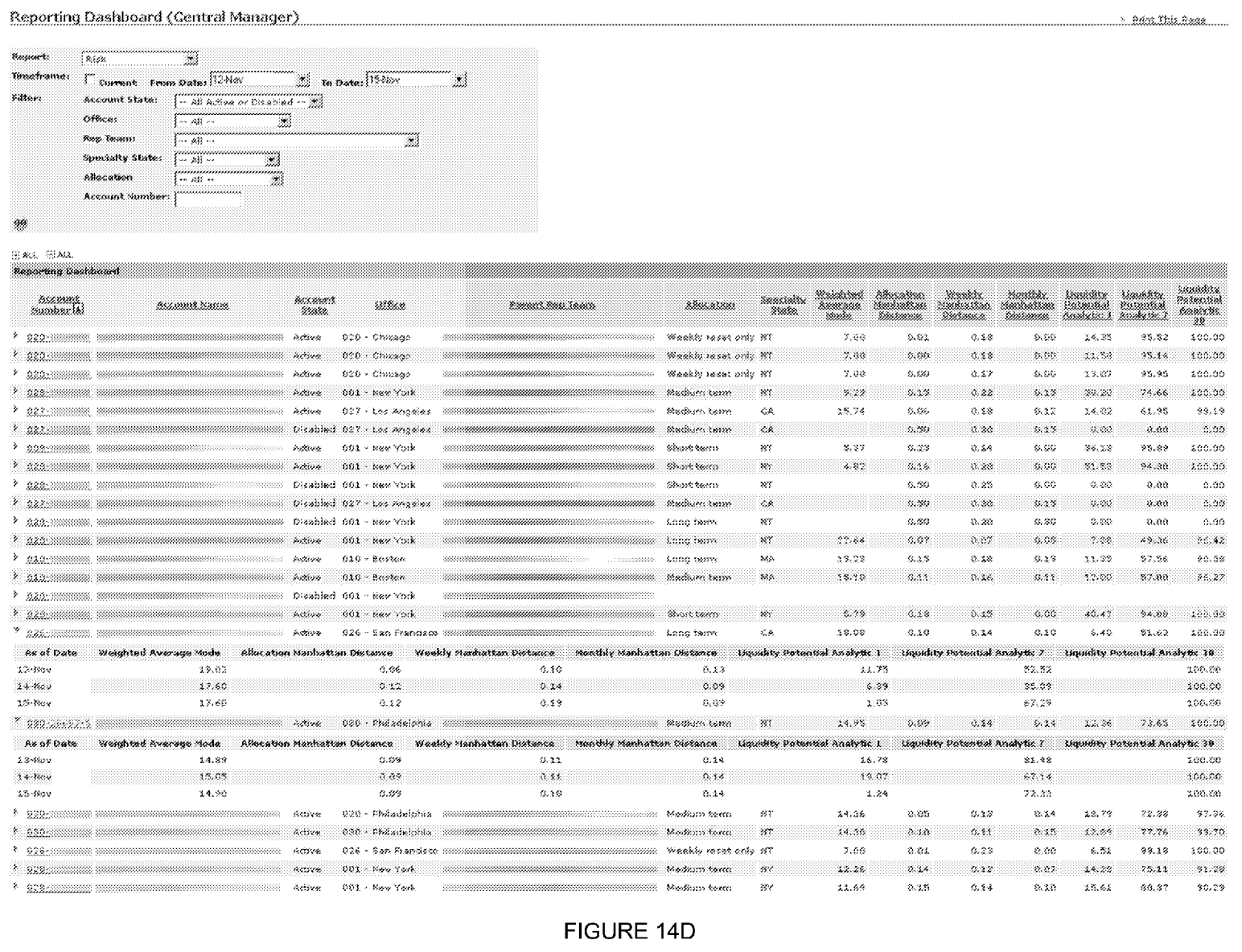

FIGS. 14A-14D are example screen images illustrating aspects of a reports dashboard user interface for an embodiment of the OPTIMIZER;

FIG. 15 is an example screen image illustrating aspects of a trade dashboard user interface for an embodiment of the OPTIMIZER;

FIG. 16 is an example screen image illustrating aspects of an auction order dashboard user interface for an embodiment of the OPTIMIZER;

FIG. 17 is an example screen image illustrating aspects of a restricted CUSIP list user interface for an embodiment of the OPTIMIZER;

Figure 1A:
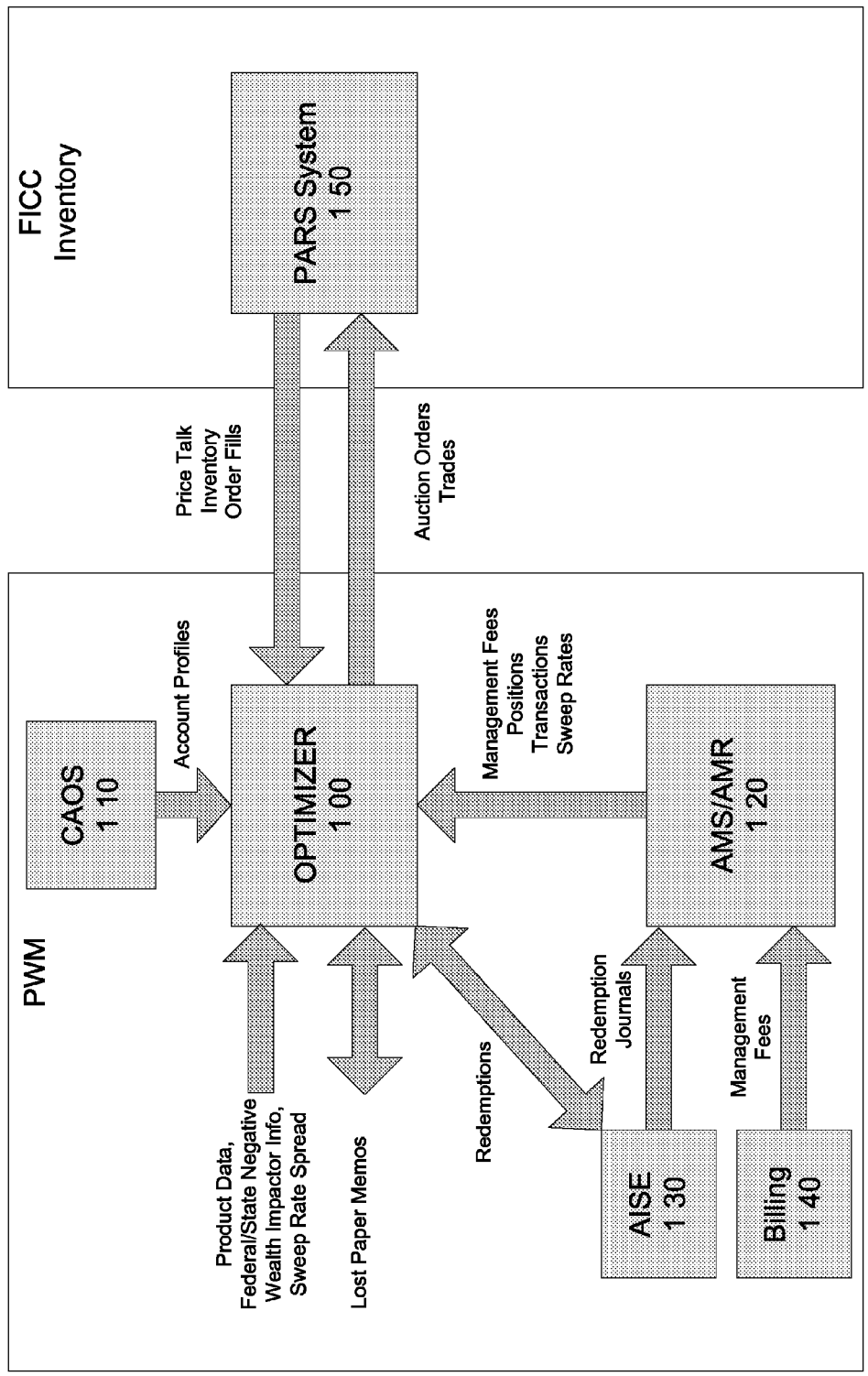
FIG. 1A provides an overview data flow diagram for an embodiment of the OPTIMIZER.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Optimizer

This disclosure details APPARATUSES, METHODS AND SYSTEMS FOR A PERIODIC AUCTION RESET SECURITIES OPTIMIZATION ENGINE (hereinafter "OPTIMIZER") that delivers dynamic management of securities and/or the like. In particular, this disclosure discusses the application of the OPTIMIZER to management of portfolios of Periodic Auction Reset Securities (PARS), a type of long-term variable rate municipal bonds. However, it is to be understood that the OPTIMIZER may be readily configured/customized for a wide range of other applications or implementations. For example, aspects of the OPTIMIZER may be adapted to other securities, financial instruments, and/or the like. It is to be understood that the OPTIMIZER may be further adapted for various other implementations or applications.

Periodic Auction Reset Securities (PARS) are a type of long-term variable rate municipal bonds. The coupon rate for PARS may be reset at regular intervals, for example, through a Dutch auction process. PARS may have a variety of reset intervals or "modes" including daily, weekly, fortnightly, 28-day, and 35-day modes. In some embodiments, PARS may be trade-commission free and may be priced at 100% of face value, while in other embodiments PARS may be priced at other values. In some embodiments, the OPTIMIZER allows a financial institution or other wealth management entity to easily maintain and invest in PARS holdings for multiple accounts. In some embodiments, the OPTIMIZER allows a financial institution to handle various types of fee arrangements (e.g., management fees and/or otherwise). Some embodiments allow a financial institution to include customized billing features where there is a charge on the product but no charge on cash. For example, if a client owns $10M on PARS and $2M in cash, there is no charge on the cash.

In one embodiment, the OPTIMIZER may provide for liquidity on a given day via entering a Sell order or orders (e.g., on an auction day) and/or crossing PARS from one client account to another client account (e.g., on a non-auction day). On an auction day, a PARS holder may have four possible actions: 1. Buy more or initiate a position conditional on the coupon rate set by an auction, similar to a limit buy order and may be called a "Bid Potential" order; 2. Sell an existing position conditionally on the coupon rate set by an auction, similar to a limit sell, and called a "Bid to Hold" order; 3. Sell outright, also called a "Sell" order; or 4. Do nothing, called a "Hold" order. If no explicit action is specified, a hold order may be the default.

In one implementation, the OPTIMIZER provides for the maintenance of a large number of separate accounts that contain only PARS. Under traditional methods, PARS position maintenance (e.g., bidding at auctions) would be labor intensive. In one embodiment, the OPTIMIZER centralizes the maintenance of PARS positions. Depending on the implementation, the OPTIMIZER may reduce required maintenance efforts/labor.

In one embodiment, the disclosed OPTIMIZER allows management of central PARS accounts in line with guidelines specified in an account profile. In one embodiment, an account profile defines the attributes of products that are allowed and not allowed in the account, allocations, and/or other constraints. In a further embodiment, the OPTIMIZER may allow sales traders to specify additional guidelines. In some embodiments, the OPTIMIZER automates account analysis, trade generation and/or participation in the auction process. As such, the OPTIMIZER may create additional bandwidth for sales traders.

In one embodiment, the OPTIMIZER may utilize optimization rules, these rules comprising account rules and actions rules. Additional rules may also be utilized. APPENDICES 1 and 2 provide additional detail regarding rules for an embodiment of the OPTIMIZER. An account rule may be used by the OPTIMIZER to validate an account based on its account profile or other business logic and may create one or more exceptions. The rule may have a score (and/or a like metric or metrics), a collection of possible action types and/or a collection of possible settlement types. In one embodiment, the higher the rule's score, the more severe will be the exceptions resulting from this rule. In one embodiment, action rules validate proposed OPTIMIZER transactions (e.g., an action or group of actions).

The OPTIMIZER may create an exception as a result of a violation of an optimization rule and the higher a rule's score, the more severe the exception will be. Each exception may also have a collection of possible action types and settlement types. A critical exception is an exception that results from violating a constraint defined in an account profile. Other exception attributes include, but are not limited to market value, score, and product profile. Market value is the total market value of the exception. In some embodiments, some exceptions may not have a measurable market value. In one embodiment, score may be calculated by multiplying the market value of rule score by the market value of the exception divided by the total account market value. In situations in which an exception does not have a market value, the score for the exceptions may be equal to the rule score. A product profile specifies which products are contributing to the exception (for sell exceptions), or which products are needed to resolve the exception (for buy exceptions).

In one embodiment, the OPTIMIZER suggests actions (e.g., trades, grouping of trades, orders, etc.) in trying to resolve exceptions, each of which is associated with a score. An action group is a set of actions suggested by the OPTIMIZER for one or more accounts. An account score is the total score of all exceptions for a particular account, and the OPTIMIZER may thus be configured to minimize the total score of all exceptions in each client account.

FIG. 1A provides an overview data flow diagram for an embodiment of the OPTIMIZER implemented in a private wealth management (PWM) setting. In such an embodiment, the OPTIMIZER component 100 may interact with numerous other components. In one embodiment, account management may be facilitated through a CAOS component 110, which may be configured to deal with, establish and/or maintain many different account types; e.g., in one embodiment this may be configures as a database 1819*a*. The CAOS component may also facilitate the tailoring of profiles to work with rules and/or constraints. The AMS/AMR component 120 or other like subscription/redemption component may allow for the manipulation of accounts, and may receive inputs from a billing component 140 (e.g., management fee details) and/or an AISE order submission component 130 (e.g., redemption journals). The AMS/AMR component 120 may also provide information such as management fees, positions, transactions, sweep rates, and/or the like to the OPTIMIZER component 100.

In one embodiment, the AISE order submission component 130 may receive order submissions, including requests for funds and/or additions of funds. It is to be noted that in some embodiments, the AISE order submission component 130 may interact with other systems dealing with other types of securities. The AISE order submission component 130 may also communicate and coordinate with the OPTIMIZER component 100, for example, regarding redemptions. The OPTIMIZER component 100 may also receive information regarding product data, negative wealth impactor data, sweep rate spread data, and/or the like. The OPTIMIZER component 100 may also receive and/or transmit lost paper information. The OPTIMIZER component 100 may also communicate and coordinate with a PARS system component 150 in FICC inventory. In one embodiment, the PARS system component manages the allocation of inventory with which the OPTIMIZER component 100 interacts. The OPTIMIZER component 100 may communicate auction orders, trades and/or the like to the PARS system component 150. The PARS system component 150 communicates price talk, inventory, order fills, and/or the like to the OPTIMIZER component 100.

Figure 1B:
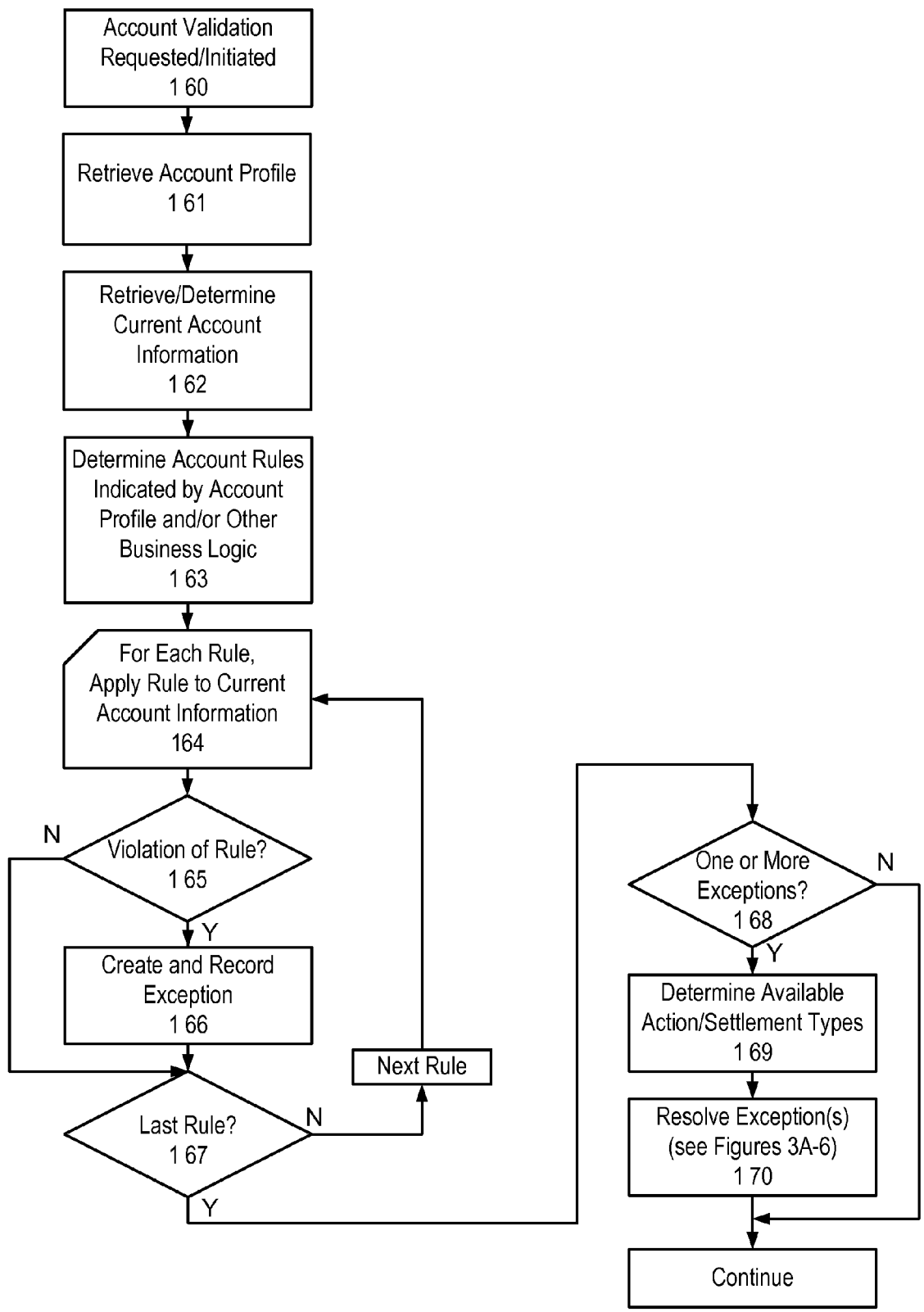
FIG. 1B provides a flow diagram illustrating aspects of account validation for an embodiment of the OPTIMIZER.

In one embodiment, as illustrated by the logic flow diagram in FIG. 1B, the OPTIMIZER may initiate and/or receive one or more requests to perform an account validation for a particular account 160, or in some embodiments, a group or selection of accounts. The request may come from the CAOS 110, AISE 130, AMS/AMR 120, PARS 150, and/or the like system requiring validation. The OPTIMIZER may retrieve an account profile 161 (or profiles), e.g., from the database 1819 and/or CAOS 110, and retrieve and/or determine current account information 162. The OPTIMIZER may then determine applicable account rules 163, which may, in certain embodiments, be indicated by the account profile and/or other business logic. Each account rule may have a score, a collection of possible action types and/or a collection of possible settlement types, e.g., see Appendices 1 & 2. Then, for each account rule, the OPTIMIZER may apply the rule to the current account information 164 to determine if there is a violation of the rule 165. For example, upon reading in the account information, the optimizer examines the field values of the account information and applies the rules to determine if any of the rule settings are breached in the field values in the account. If there is no violation for that rule 165, the OPTIMIZER may determine if that was the last rule for the account 167 and if not, applies the next rule 164. If there is a violation of the rule 165, the OPTIMIZER may create and record an exception 166. In one embodiment, the higher the rule's score, the more severe will be the exceptions resulting from this rule. The OPTIMIZER applies all the indicated rules 164 and records created exceptions for any violations 166. Once all of the rules have been applied 167, if there are one or more exceptions 168, the OPTIMIZER determines and identifies available action and/or settlement types or options 169.

As discussed above, each exception may have a collection of possible action types and settlement types, and a critical exception is an exception that results from violating a constraint defined in an account profile. Exception attributes may include, but are not limited to market value (i.e., total market value of the exception), score, and product profile. In some embodiments, a score may be calculated by multiplying the market value of rule score by the market value of the exception divided by the total account market value. As discussed above, in situations in which an exception does not have a market value, the score for the exceptions may be equal to the rule score. Also as noted above, product profile specifies which products are contributing to the exception (for sell exceptions), or which products are needed to resolve the exception (for buy exceptions).

In some embodiments, the OPTIMIZER may suggest and/or perform actions (e.g., trades, grouping of trades, orders, etc.) in trying to resolve exceptions 170, and each action is associated with a score. An action group is a set of actions suggested by the OPTIMIZER for one or more accounts. Each action is generally either a Buy or a Sell and, in one embodiment, may be of one of the following types: 1. Inventory (Buy only)—executes a Buy trade to purchase products from inventory; 2. Inventory Swap—swaps equal market values of a product between a client and inventory executing a Sell trade followed by a Buy trade from a client account; 3. Cross—moves a product from one client to another client by executing a Sell trade for the first client followed by a Buy trade for the second client; 4. Swap (Client)—swaps equal market values of two products between two clients, e.g., via executing a Sell trade for each client followed by a Buy trade for each client; 5. Auction—Buy (Bid Potential order) or Sell (Sell order) products at auction. FIGS. 3A-6 provide additional detail on some of the available actions. An account score is the total score of all exceptions for a particular account, and the OPTIMIZER may thus be configured to minimize the total score of all exceptions in each client account in order to resolve the exceptions 170.

Some embodiments may utilize action rules to validate proposed OPTIMIZER transactions (e.g., an action or group of actions). As described above, each rule may have a score, a collection of possible action types and/or a collection of possible settlement types. The OPTIMIZER may utilize such action rules in determining the appropriate actions to undertake or perform. In one embodiment, the higher the rule's score, the more severe will be the exceptions resulting from this rule.

Figure 2:
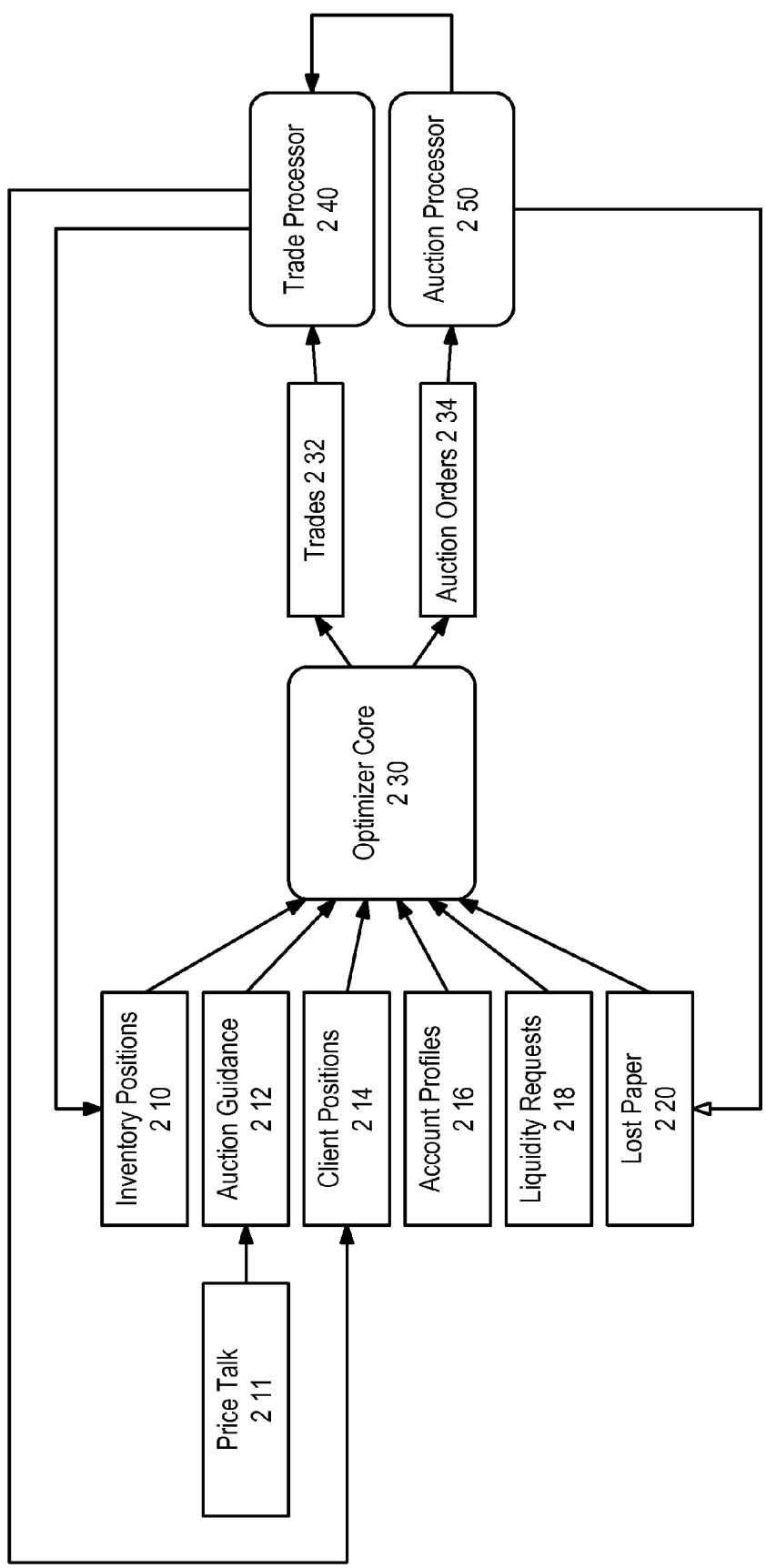
FIG. 2 provides a flow diagram illustrating aspects of the OPTIMIZER.

FIG. 2 provides a flow diagram illustrating aspects of the OPTIMIZER. In one embodiment, the OPTIMIZER core 230 receives various inputs 210-220. One input may be inventory positions 210, e.g., FICC traders' inventory. Price talk 211 and/or auction guidance 212 inputs may be used to determine products that are auctioning and/or prepared to auction, and may set rates for bid-to-hold and bid-potential orders. Another input may be positions 214 (e.g., client positions), which in some embodiments may be loaded from the PAPI. The OPTIMIZER core 230 may also receive account profiles 216, which may include client guidelines (for example, as entered in CAOS), as well as redemption or liquidity requests 218 (e.g., requests entered in AISE to withdraw cash at a specified date and/or the like). These inputs may be user and/or system initiated. For example, in some instances client positions and account profiles may be accessed because of an AMS/AMR 120 request, while in other instances, a user may access and/or affect a change in their account over a terminal.

The liquidity potential is the amount of money that can be redeemed into cash today (SD) or the next business day (SD+1). In some embodiments, this amount is the total of cash in the account and the market value of the account's sweep product. However, the sweep is not included in SD liquidity potential if the sweep redemption cut off time has passed.

The OPTIMIZER core 230 may also receive lost paper 220, i.e., memos tracking the amount of paper lost at auction from bid-to-hold orders or sold because of critical exceptions. Other possible inputs may include, but are not limited to: negative wealth impactor information, which may be used to calculate post-negative-wealth-impactor yield (e.g., the coupon rate of a product, taking into account all (e.g., federal and state) negative wealth impactor(s) for a specified client); product data (e.g., loaded from a product API); and sweep vehicles, which may be used as a benchmark for accounts (e.g., loaded from PAPI). These inputs may come from database sources such as the OPTIMIZER database 1819 or other interconnected databases. Also, the inputs may be system and/or user initiated as already discussed.

Per Account Product Sorting

In one embodiment, post-negative-wealth-impactor yield may be assigned a score and placed in a list of rules. When analyzing two products for a potential buy/sell, the OPTIMIZER may first check that the products are allowed for the account by all the rules that rank above post-negative-wealth-impactor yield. If both products are allowed by these rules, the OPTIMIZER may look at the post-negative-wealth-impactor yield. If the post-negative-wealth-impactor yield is the same, the OPTIMIZER checks that the products are allowed for the account by all the rules that rank below post-negative-wealth-impactor yield.

Liquidity Analytics Component

Some embodiments of the OPTIMIZER utilize a liquidity analytics component. The liquidity analytics component may calculate an anticipated completion date for partial or full redemptions for a given account. The completion date is the date on which the cash will be raised by selling the underlying product(s). The liquidity analytics component calculates the worst-case date (assuming the products must be sold at auction and no cross partners are available) for a full or a partial redemption.

For calculating an anticipated completion date for a partial redemption, the liquidity analytics component determines if there are PARS positions in the account. If there are no PARS positions in the account, the component or function returns SD (same day) or SD+1 (next day) as the date of anticipated completion date, given that the sum of the liquidity request and outstanding request amount is less than SD liquidity potential or SD+1 liquidity potential, respectively. Otherwise, the liquidity analytics component sorts the positions by corresponding products' next settlement date. The OPTIMIZER may aggregate the sum of position value until it is greater than or equal to the sum of liquidity request and outstanding request amount, where the next settlement date of the last position aggregated is the anticipated completion date.

For determining the anticipated completion date for full redemptions, liquidity analytics component determines if there are PARS positions in the relevant account(s). If there are no PARS positions in the account, the function returns SD as the anticipated completion date (or SD+1 date, if the liquidity potential on SD+1 is greater than the SD liquidity potential). Otherwise, the liquidity analytics component finds the position which has the latest next settlement date, and this position's product's next settlement date is the anticipated completion date.

For risk reporting, the liquidity analytics component may determine, for a given number of days (X), the percentage of an account's holdings that could be liquidated into cash X days from now if the OPTIMIZER were to only sell at auction.

Inventory-Buy Component

Some embodiments of the OPTIMIZER may utilize an inventory-buy component. The inventory-buy component may buy products from inventory for accounts that have exception(s) as a result of available cash.

Figure 3A:
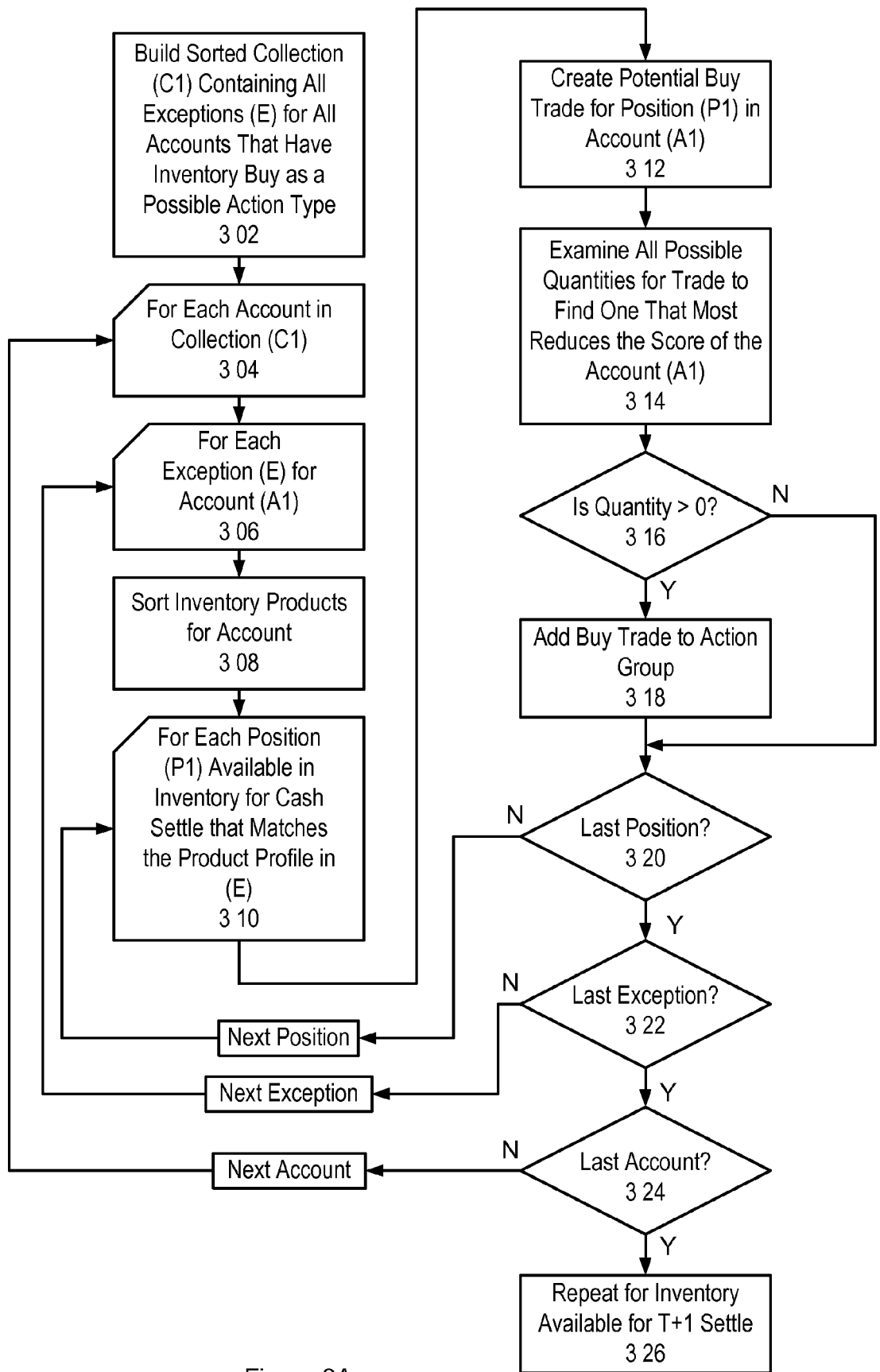
FIGS. 3A and 3B provide detail for an embodiment of an inventory-buy component in one implementation of the OPTIMIZER.

FIG. 3A provides a flow diagram detailing one embodiment of the inventory-buy component. The inventory-buy component builds a sorted collection (C1) containing all exceptions (E) for all accounts that have inventory-buy as a possible action type 302. For each account in the collection 304, and for each exception in an account 306, the inventory-buy component sorts the inventory products for the account 308 (e.g., in ascending order, best first and worst last). Then for each position available in inventory for cash settlement that matches the product profile in the exception 310, the inventory-buy component creates a potential buy trade for the position in the account 312. The inventory-buy component goes through all possible quantities for the trade and identifies the one that will most reduce the score of the account 314. If the quantity is greater than zero 316, the inventory-buy component may add the buy trade to the action group 318. The process is conducted for all specified positions 320, exceptions 322, and accounts 324, and may repeat for inventory available for T+1 settle 326.

Figure 3B:
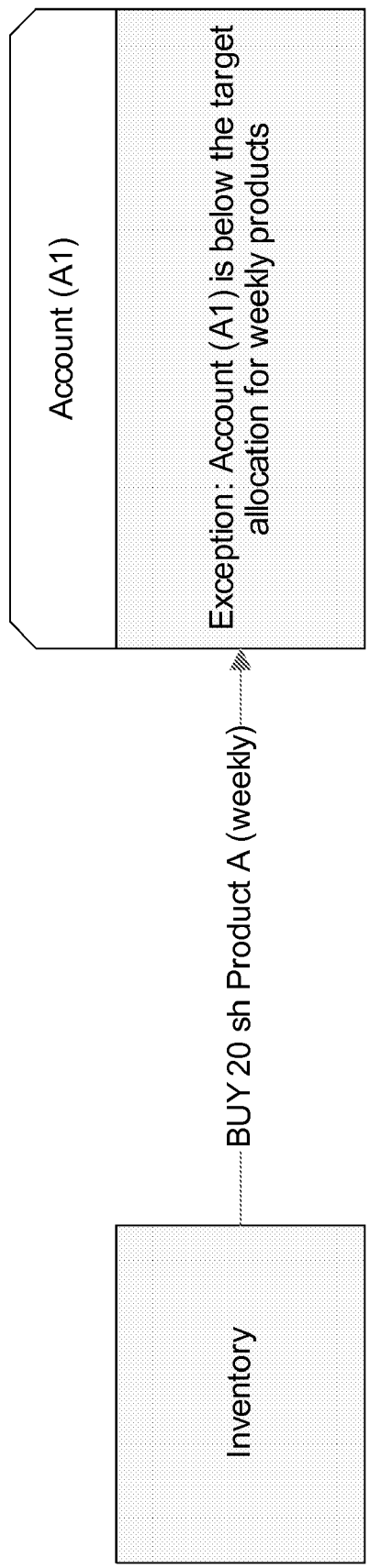

For example, as illustrated in FIG. 3B, an account (A1) may have an exception because it is below the target allocation for weekly products. If there is enough cash in the account, the inventory-buy component may identify and buy the appropriate number of shares (e.g., 20 shares) of some weekly product and move the shares into the account.

Inventory-Swap Component

Some embodiments of the OPTIMIZER may utilize an inventory-swap component to swap equal market values of products between a client account and inventory. Depending on the implementation, the inventory-swap component may require that a certain amount of available cash may be necessary in order to pay for differences in accrued interest for the products.

Figure 4A:
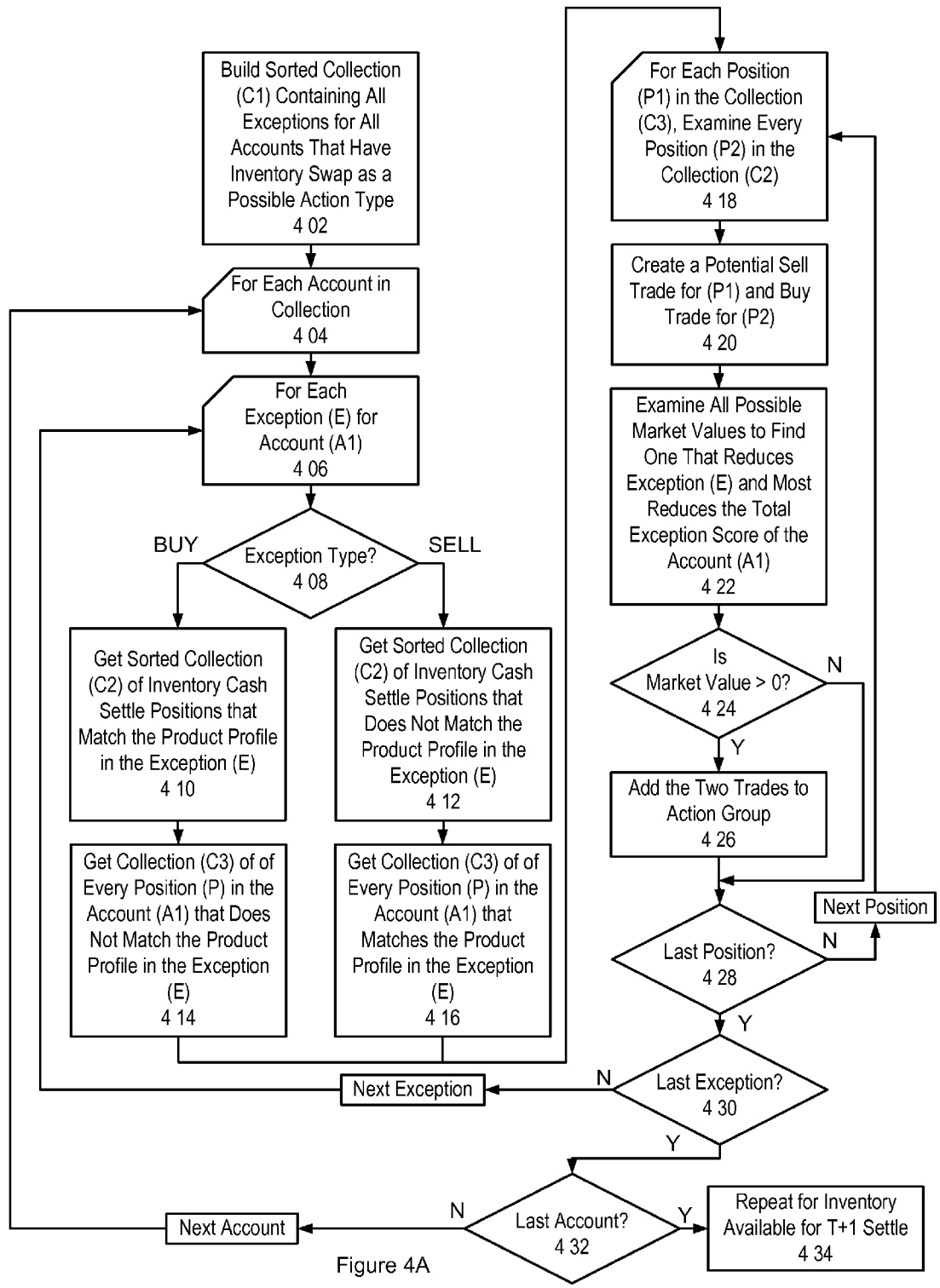
FIGS. 4A and 4B provide detail for an inventory-swap component in one embodiment of the OPTIMIZER.

FIG. 4A provides a logic flow diagram for an embodiment of the inventory swap component. In this embodiment, the inventory-swap component builds a sorted collection (C1) containing all exceptions for all accounts that have inventory-swap as a possible action type 402. For each account in the collection 404, for each exception (E) for an account (A1) 406, if the exception type is a buy exception 408, the inventory-swap component gets a sorted collection (C2) of inventory cash settle positions that match the product profile in the exception (E) 410. If the exception type is a sell exception 408, the inventory swap component gets a sorted collection (C2) of inventory cash settle positions that does not match the product profile in the exception (E) 412. The inventory-swap component may then get a collection (C3) of every position (P) in the account (A1) that matches the product profile in the exception (E) 416 (if sell exception) or does not match the product profile in the exception (E) 414 (if buy exception). For every position (P1) in the collection (C3), the inventory-swap component examines every position (P2) in the collection (C2) 418, and may create a potential sell trade for (P1)

and a buy trade for (P2) 420. The inventory-swap component then goes through all the possible market values for the trade and finds the market value that reduces exception (E) and most reduces the total exception score of the account (A1) 422. If the market value is greater than zero 424, the two trades are added to the action group. The process is conducted for all specified positions 428, exceptions 430, and accounts 432, and may be repeated for inventory available for T+1 settle 434.

Figure 4B:
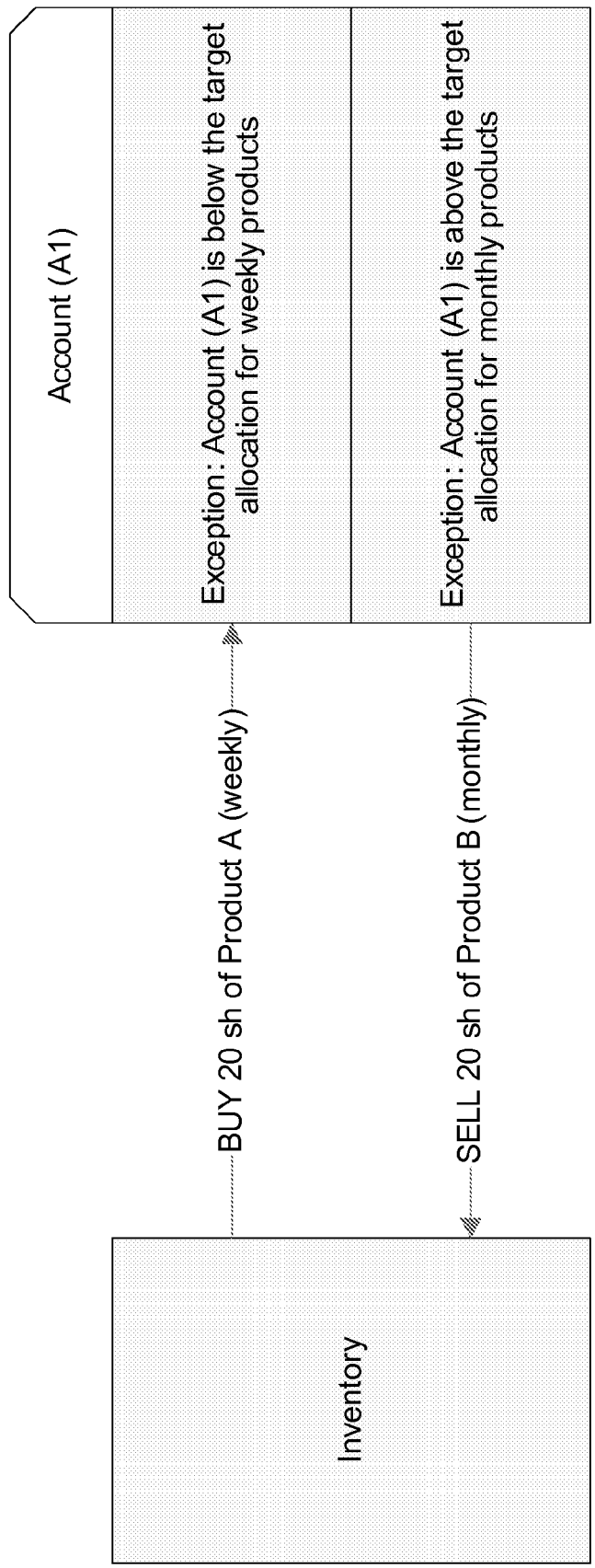

For example, as shown in FIG. 4B, an account may be above the target allocation for monthly products and below the target allocation for weekly products. The inventory-swap component may direct the sale of a certain number of shares of a monthly product and then the purchase of the necessary number of shares of a weekly product, provided the account has enough cash to pay for the difference in accrued interest between the monthly product and the weekly product.

Cross Component

Some embodiments of the OPTIMIZER may utilize a cross component to sell products from one client account into a different client account. Depending on the implementation, the cross component may require that the buying account have enough cash to purchase the products being sold.

In one embodiment, illustrated in FIG. 5A, the cross component builds a sorted collection (C1) containing all exceptions for all accounts that have cross as a possible action type. For each account in the collection (C1), for each exception (E1) in that for account (A1), the cross component gets a collection (C2) of exceptions with the opposite action type of the exception (E1) and account not equal to account (A1). Then, for each exception (E2) for account (A2) in collection (C2), the cross component gets a collection (C) of positions in account (A1) that match the product profiles in sell (S) and buy (B). Then for each position (P) in the collection (C), the cross component creates a potential sell trade in account (A1) and a potential buy trade in account (A2). The cross component finds the maximum quantity of the trade that will improve the score of both account (A1) and account (A2), an suggests a cross. If the quantity is greater than zero, the cross component adds the two trades to the action group.

For example, as shown in FIG. 5B, an account (e.g., A1) may hold a number of shares (e.g., 20) of some product (e.g., product A) which is vulnerable to a negative wealth impactor, which is not allowed by the account's profile. The cross component will sell the shares of the product to the inventory. Another account (e.g., A2), one that allows products vulnerable to negative wealth impactors, and that has enough cash available (e.g., $500 million), may then buy the shares sold into inventory.

Client Swap Component

Some embodiments of the OPTIMIZER may utilize a client swap component to swap equal market values of two products between two accounts. Depending on the implementation, the client swap component may require one of the accounts to have cash available to cover differences in accrued interest, if any.

Figure 6A:
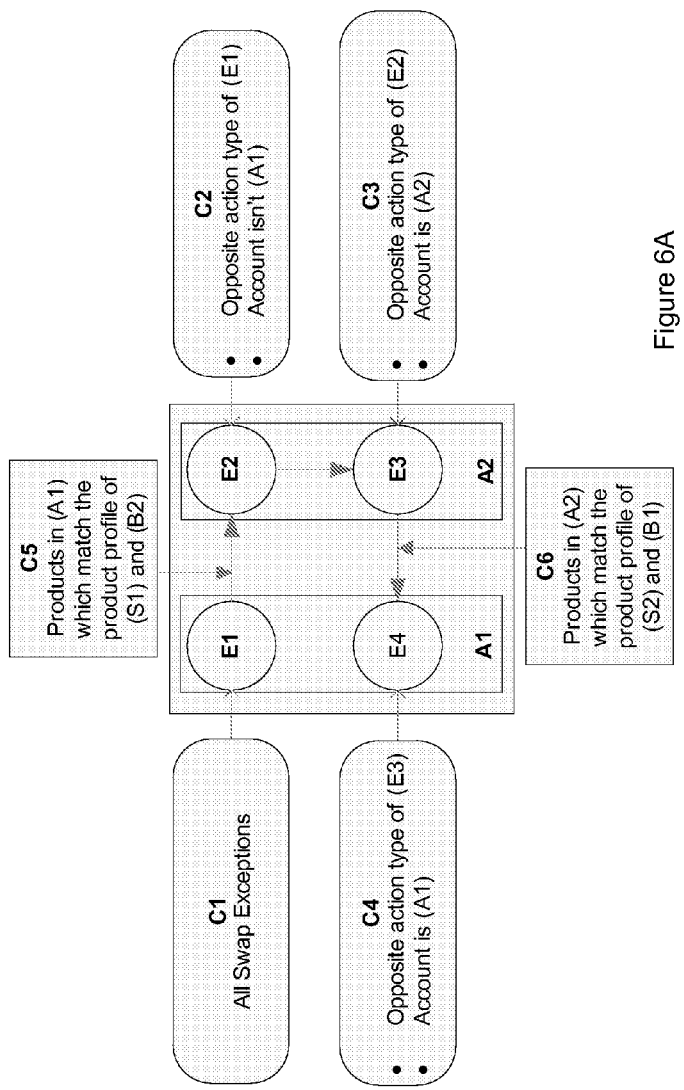
FIGS. 6A and 6B provide detail for a client swap component in one embodiment of the OPTIMIZER.

In one embodiment, illustrated in FIG. 6A, the client swap component builds a sorted collection (C1) containing all exceptions for all accounts that have client swap as a possible action type. For each exception (E1) for an account (A1) in the collection (C1), the client swap component gets a collection (C2) of exceptions with the opposite action type of exception (E1) and account not equal to account (A1). Then, for each exception (E2) for account (A2) in collection (C2), the client swap component gets a collection (C3) of exceptions with the opposite action type of exception (E2) and the account equal to (A2). For each exception (E3) in collection (C3), the client swap component gets a collection of exceptions (C4) with the opposite action type of exception (E3) and account equal to (A1). The client swap component gets a collection (C5) of positions in account (A1) that match the product profiles in exceptions (E1) and (E2). The client swap component gets a collection (C6) of positions in account (A2) that match the Product Profiles in exceptions (E3) and (E4). Then, for each position (P1) in collection (C4), for each position (P2) in collection (C5), the client swap component creates a potential sell trade for position (P1) in account (A1) and a buy trade for position (P1) in account (A2). The client swap component creates a potential sell trade for (P2) in account (A2) and a buy trade for (P2) in account (A1). The client swap component then finds the maximum market value of the trades that will improve the score of both accounts A1 and A2. If the market value is greater than zero, the client swap component adds the four trades to the action group.

Figure 6B:
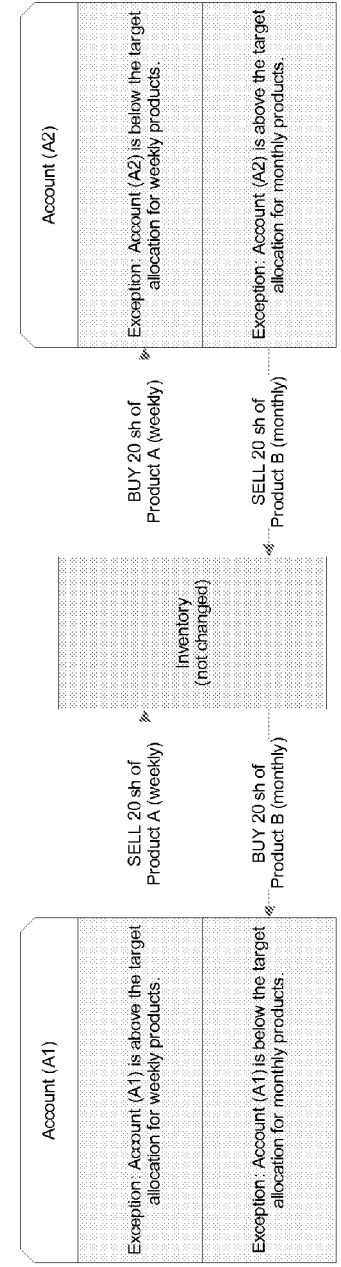

For example, as shown in FIG. 6B, a first account (A1) may be above the target allocation for weekly products and below the target allocation for monthly products. Another account (A2) may be below the target allocation for weekly products and above the target allocation for monthly products. The client swap component may sell shares of the weekly product (e.g., 20 shares of product A) from account (A1) and shares of the monthly product from account (A2) to inventory (e.g., 20 shares of product B). The client swap component may then purchase from inventory shares of the monthly product for account (A1) and purchase from inventory shares of the weekly product for account (A2).

Auction Component

Some embodiments of the OPTIMIZER may utilize an auction component to create bid potential (BP) or sell (S) auction orders. In some implementations require that an account have a specified amount of cash to place a bid potential order.

In one embodiment, the auction component builds a sorted collection (C1) containing all exceptions for all accounts that have auction buy as a possible auction type. For each exception (E1) for account (A1) in collection (C1), for each product (P1) which is auctioning today and matches the product profile in exception (E1), the auction component creates a potential bid potential auction order for product (P1) in account (A1). The auction component determines the maximum quantity for the auction order that will improve the account score of account (A1). If the quantity is greater than zero, the auction component adds the auction order to the action group.

In one embodiment, the auction component builds a sorted collection (C1) containing all exceptions that have auction sell as a possible action type. For each exception (E1) for an account (A1) in collection (C1), for each product (P1) in the account (A1) which matches the product profile in (E1), the auction component creates a potential sell auction order for product (P1). The auction component then finds the maximum quantity for the auction order that will improve the account score of the account (A1). If the quantity is greater than zero, the auction component adds the auction order to the action group.

In one implementation, the OPTIMIZER provides PARS account portfolio management and optimization by obtaining or receiving an indication or indications of changes in the status of one or more account profiles (e.g., via an account profile status change indicator). Such status changes (and associated indications thereof) may be based on, representative of, and/or generated by changes in the structure of the account, requested changes in the account (e.g., liquidity requests, etc.), changes in market data or other information (including trader or other entered information) that impact or otherwise affects one or more accounts. Market data may be obtained and/or held in the optimizer database 1819*d*, for example, via Reuters Real-Time Data feed, and/or the like. The OPTIMIZER may retrieve one or more account profiles based on the status changes (and/or associated indicators) and enqueue the account profile(s) for optimization review. Account profiles may be retrieved from the review queue and analyzed to identify account attributes and/or associated or corresponding rules. In one embodiment, rules may be retrieved from a rule database based on an account profile (and/or an analysis of elements thereof) and/or other information. Alternatively or additionally, a rule or rules may be present in or associated with a particular account profile. The OPTIMIZER determines if there is a violation of the rule(s) in the account or accounts, and if so, may create or enter an exception in the account profile (and/or other record). As discussed previously, rules and/or exceptions may, in some embodiments, have an associated score, with the magnitude of the score corresponding to the severity of the rule violation/exception. Individual accounts and/or profiles may have an indication of the magnitude or severity of the total rule violations/exceptions therein, for example, as indicated by an account total score. As described above and below in more detail, the OPTIMIZER determines one or more possible action types (e.g., inventory swap, inventory buy, inventory cross, auction, etc.) that can best resolve the exceptions (and thus lower the total score, when implemented or executed). The OPTIMIZER may also set parameters for the action type (e.g., volume, timing, etc.) that best resolve the exceptions (i.e., lower the account total score the most, relative to alternative parameters). In some embodiments, indicated action types, along with appropriate parameters, may be then be executed, either individually or in aggregate. For example, in one embodiment, action types and parameters for one or more accounts may be enqueued for execution, and executed along with similar (and/or complimentary) action types.

User Interface

Figure 7:
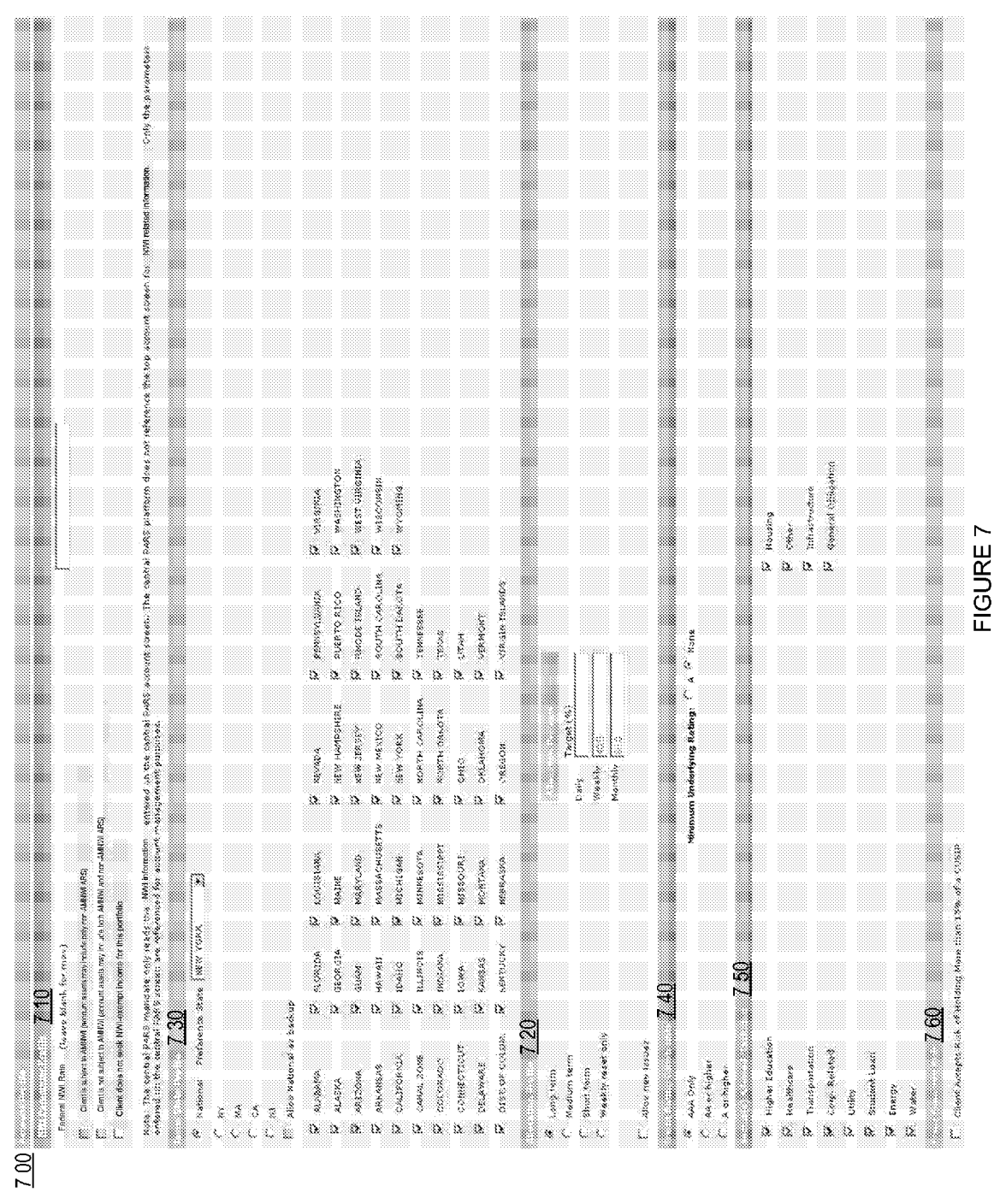

FIG. 7 is an example screen image illustrating aspects of an account profile user interface for an embodiment of the OPTIMIZER. The account profile user interface 700 may be used to specify various account constraints for a client. These constraints may include, but are not limited to, negative wealth impactor (NWI) parameters 710, portfolio allocations 720, preference state 730, credit rating restrictions 740, sectors to be included or excluded 750, issue exposure risk acceptance 760, and/or the like. In one embodiment, these parameters may be prefilled on a form (e.g., via an ANNEX A form as provided in APPENDIX 4, and/or the like) of the account opening documentation sent to a client.

Figure 8A:
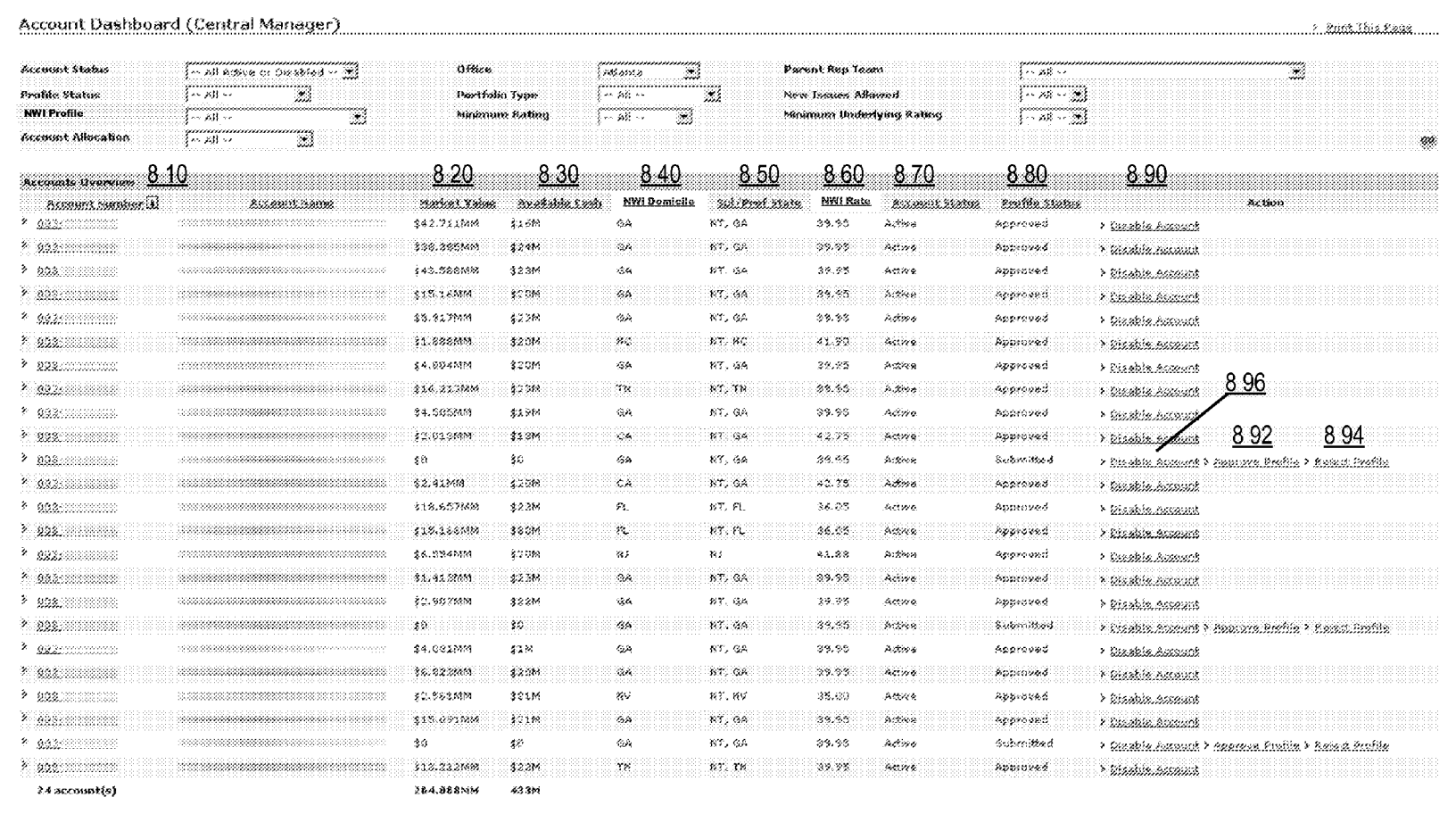
Figure 8B:
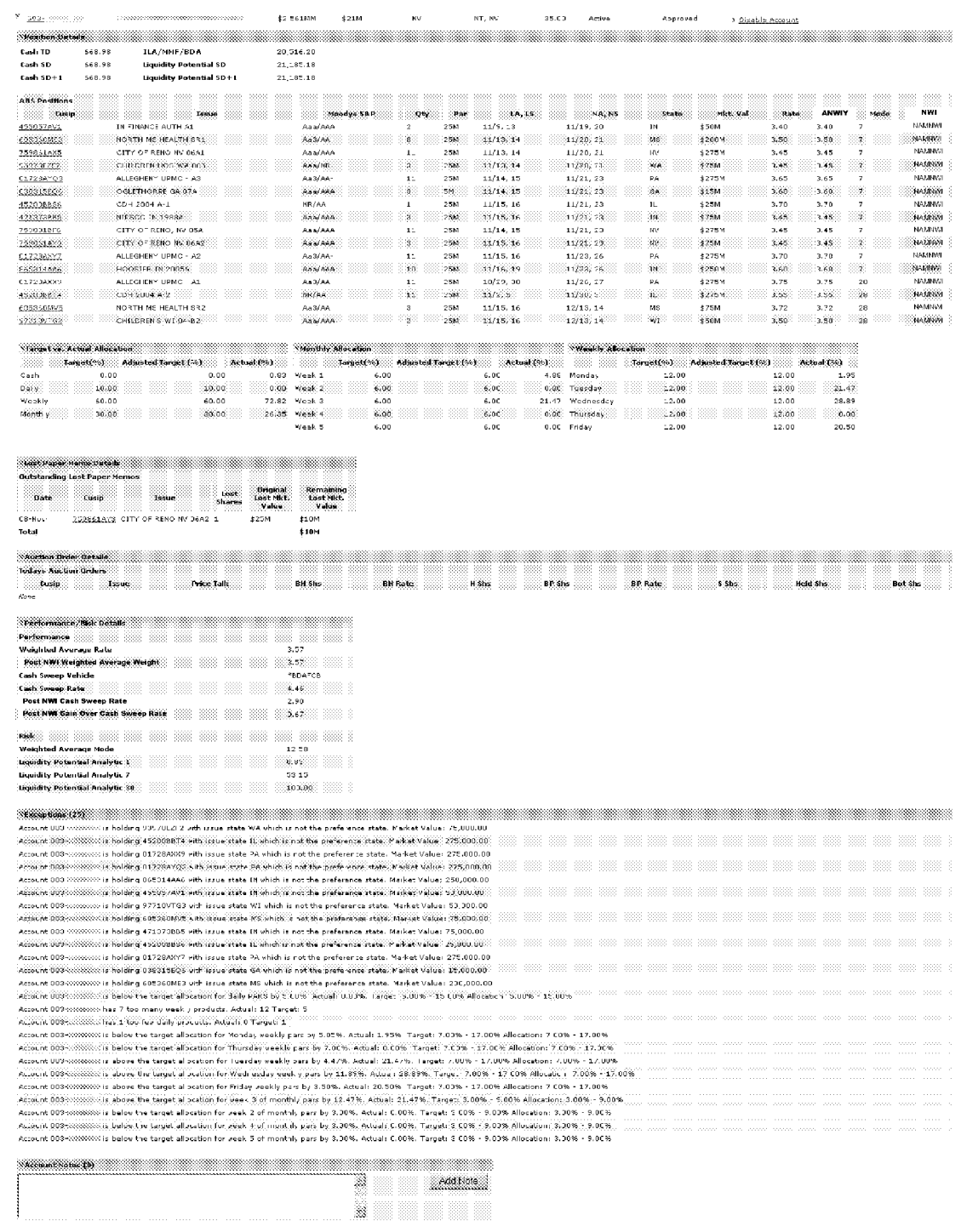

FIGS. 8A and 8B provide example screen images illustrating aspects of an account dashboard user interface for an embodiment of the OPTIMIZER. The account dashboard interface provides a summary of each account 810, including but not limited to the total market value 820, available cash 830, negative wealth impactor domicile 840, primary/preference state 850, negative wealth impactor rate 860, account status 870, profile status 880, available action 890, and/or the like. Some embodiment may provide an option to drill down into each account to see more details. Using the Account Dashboard, a sales trader may be able to approve 892 or reject 894 account profile changes and/or enable/disable 896 accounts. Some embodiments may also provide tools (such as drop-down menus) to search and/or select accounts according to particular criteria.

Figure 9:
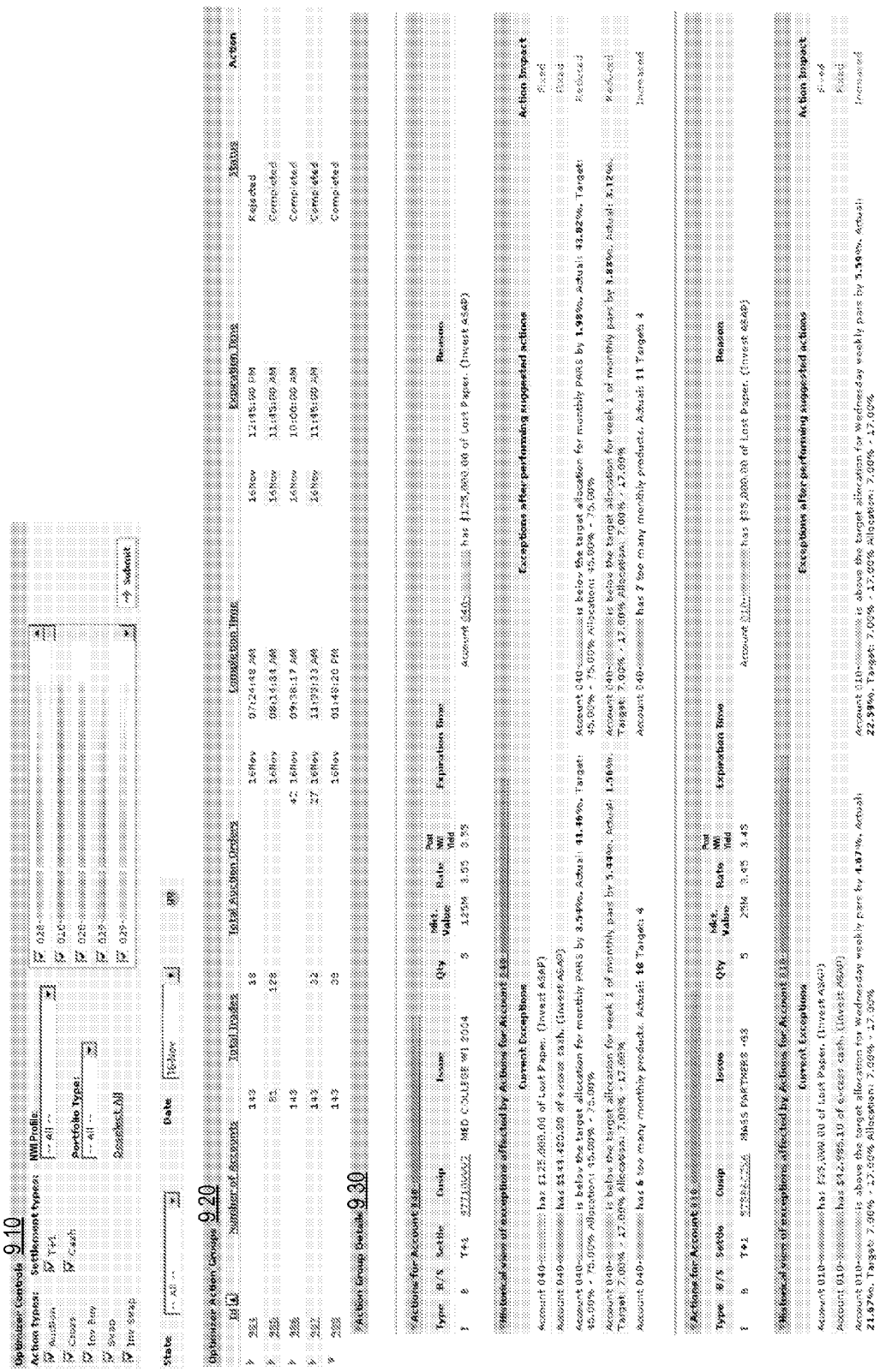
FIG. 9 is an example screen image illustrating aspects of an optimization dashboard user interface for an embodiment of the OPTIMIZER.
Figure 14B:
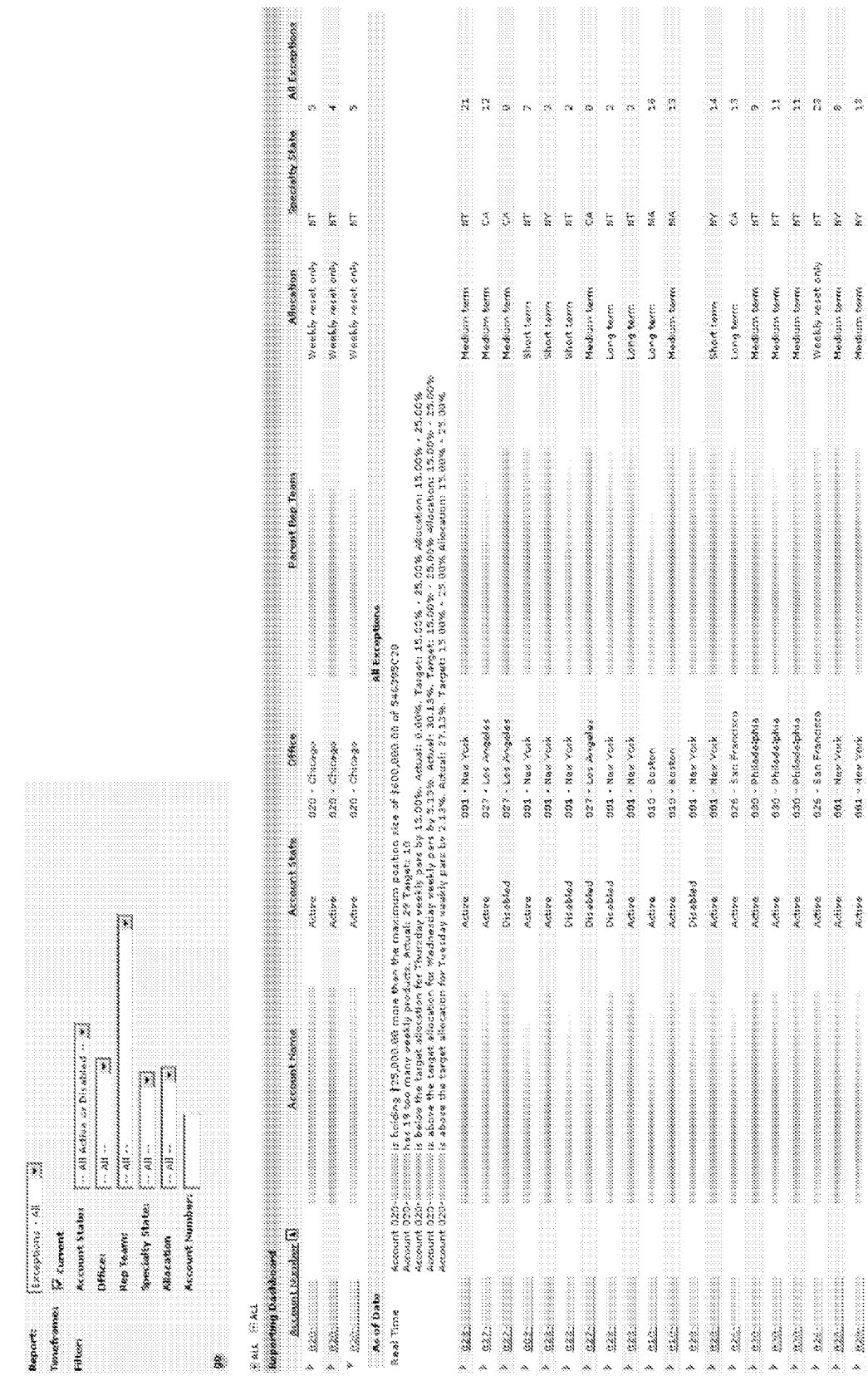
Figure 14C:
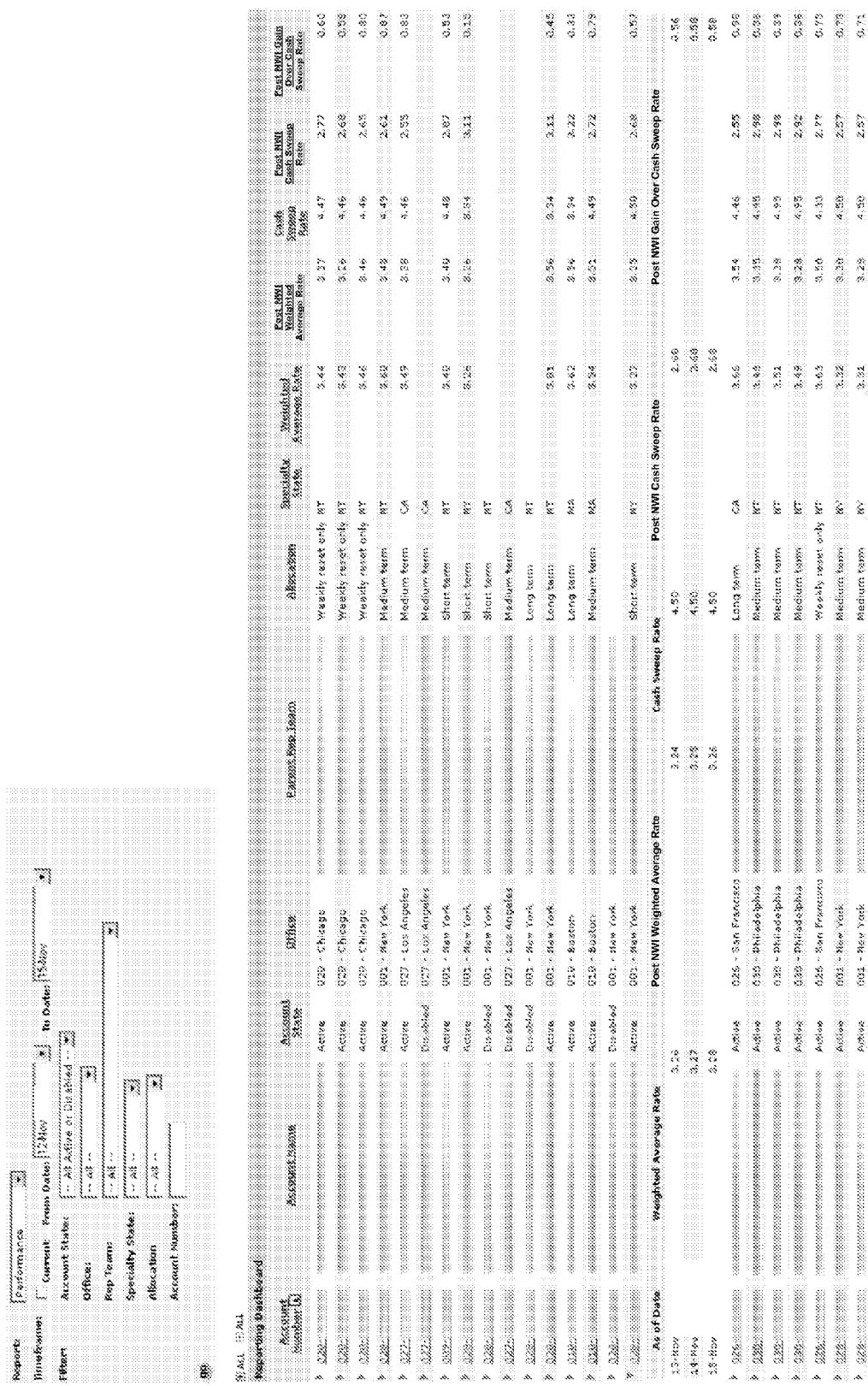

FIG. 9 is an example screen image illustrating aspects of an optimization dashboard user interface for an embodiment of the OPTIMIZER. In one embodiment, the optimization dashboard interface provides OPTIMIZER controls 910, allowing a user to start an optimization process and review the results. The optimization dashboard allows a user to review OPTIMIZER action groups 920, and action group details 930 for each action group. In one implementation, when drilling down into an action group, a sales trader or the like is able to see the suggested actions and a side-by-side comparison of exceptions before and after those actions are performed. A sales trader (or other user) may then either approve or reject the suggested action group.

FIG. 10 is an example screen image illustrating aspects of a sweep rate spread user interface for an embodiment of the OPTIMIZER. In one embodiment, the sweep rate spread interface allows a sales trader or other user to specify an auction bid rate 1010, for example, defined in terms of basis points that are to be added to the account's money market rate. One implementation utilizes a three-dimensional matrix 1020, where the three dimensions in the matrix are sweep vehicle rating (e.g., AAA or Non-AAA), issue state (e.g., CA/MA/NY/NJ/NT), and product mode (e.g., Daily/Weekly/Monthly).

Figure 11:
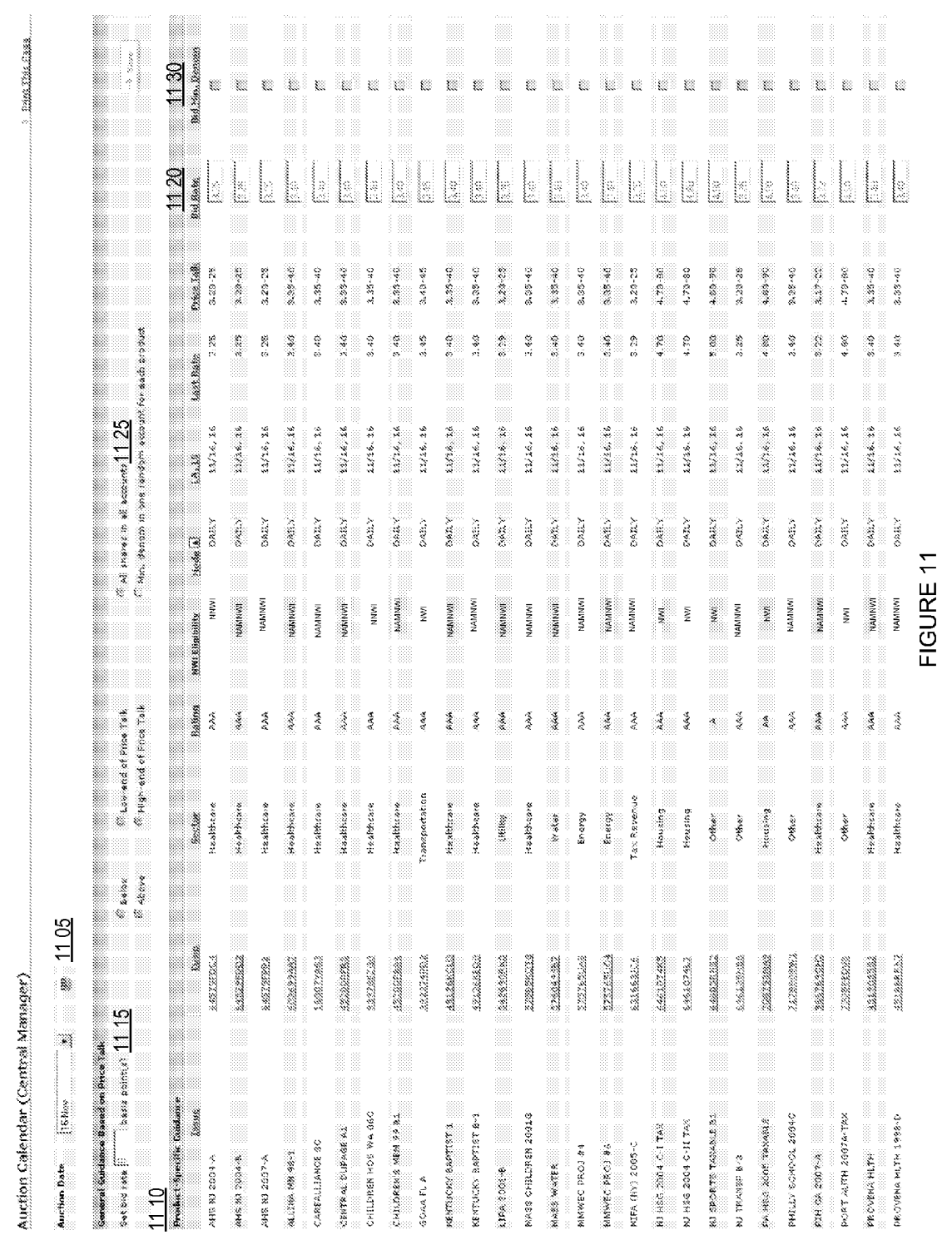

FIG. 11 is an example screen image illustrating aspects of an auction calendar user interface for an embodiment of the OPTIMIZER. In one embodiment, the auction calendar interface may list all the products that are scheduled to auction 1110 for a specified day 1105. A sales trader or similar user may have the option to specify a bid rate across all products 1115 (e.g., based on the Price Talk range), or define a custom rate for each product 1120. A manager or like user may also be able to specify the method for which shares are to be allocated for Bid-To-Hold orders (e.g., all shares in all accounts 1125 or min. denom in one random account 1130).

Figure 12:
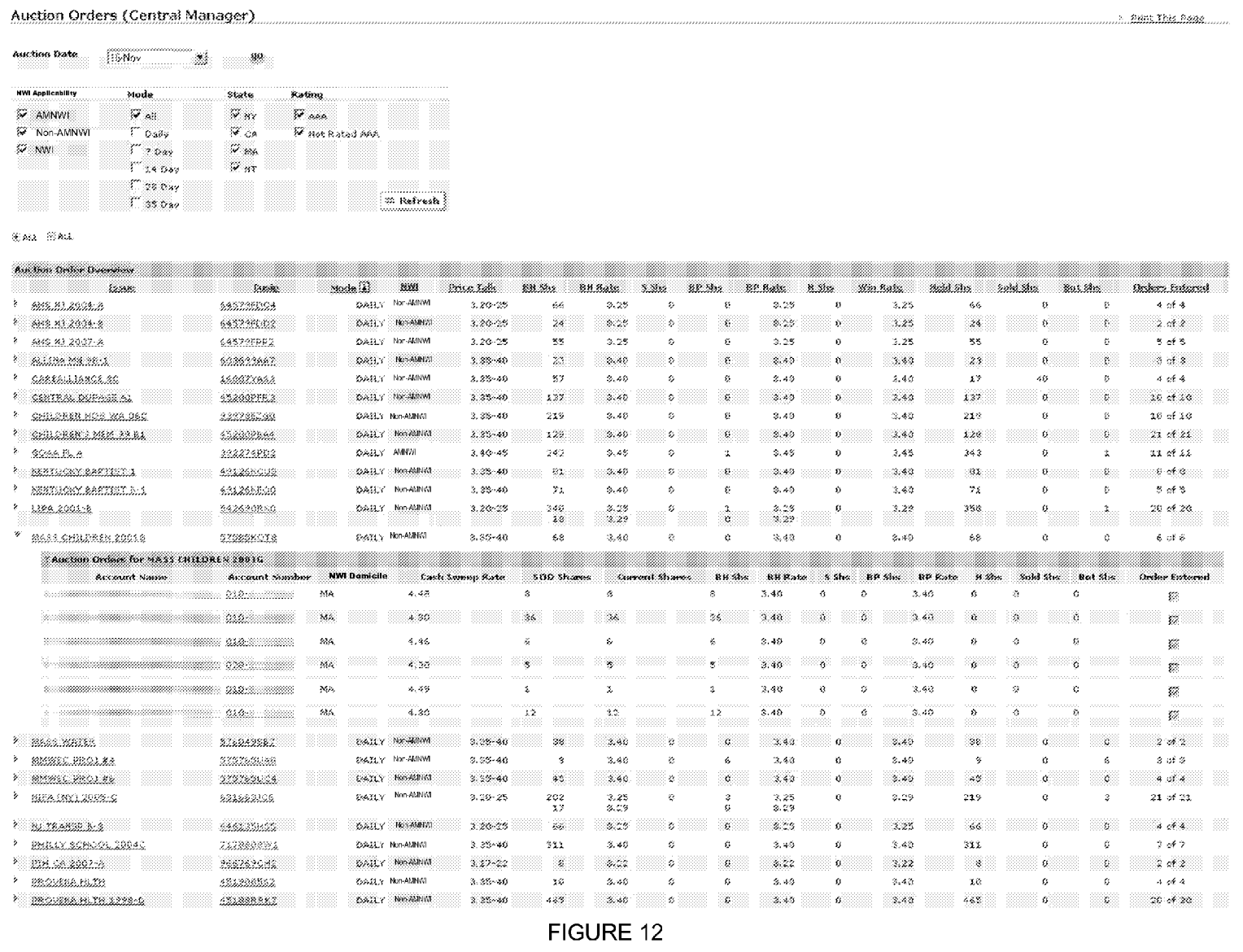

FIG. 12 is an example screen image illustrating aspects of an auction orders user interface for an embodiment of the OPTIMIZER. In one embodiment, the auction orders interface provides a summary of all the auction orders for the day. An authorized user (e.g., sales trader) may have the option to set a custom bid rate for each position in every account before the auction starts. After the auction, the interface may display winning rates for each product.

Figure 13:
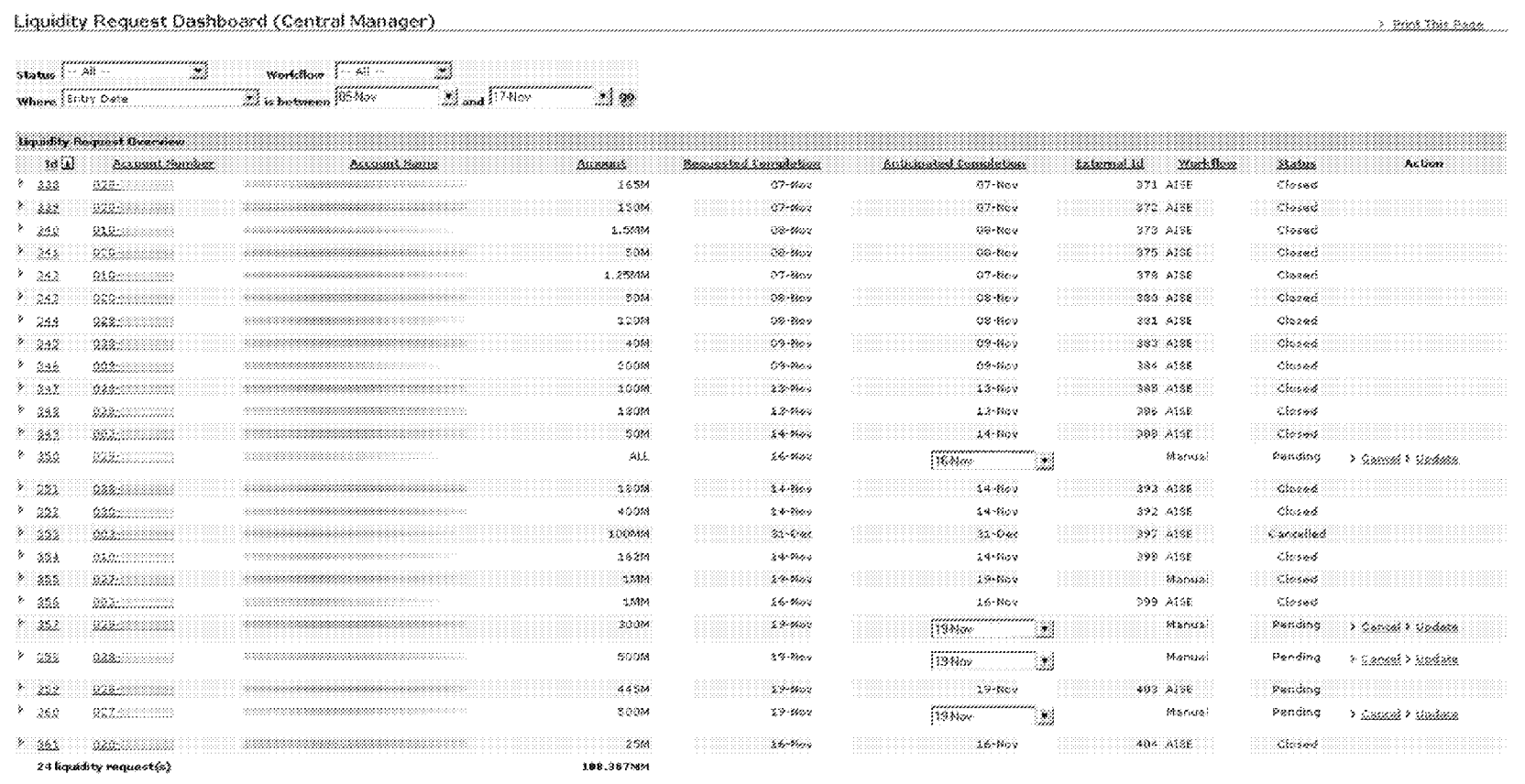

FIG. 13 is an example screen image illustrating aspects of a liquidity request dashboard user interface for an embodiment of the OPTIMIZER. In one embodiment, the liquidity request dashboard interface may display liquidity requests (i.e., redemptions) submitted (e.g., submitted by teams) and approved (e.g., approved by a sales trader). The liquidity request dashboard interface may also display reserved cash requests for new issues.

FIGS. 14A-14D are example screen images illustrating aspects of a reports dashboard user interface for an embodiment of the OPTIMIZER. The reports dashboard interface displays reports for accounts. These reports may include account profile history (FIG. 14A), exceptions (FIG. 14B), performance analytics (FIG. 14C), risk analytics (FIG. 14D), and/or the like.

Figure 15:
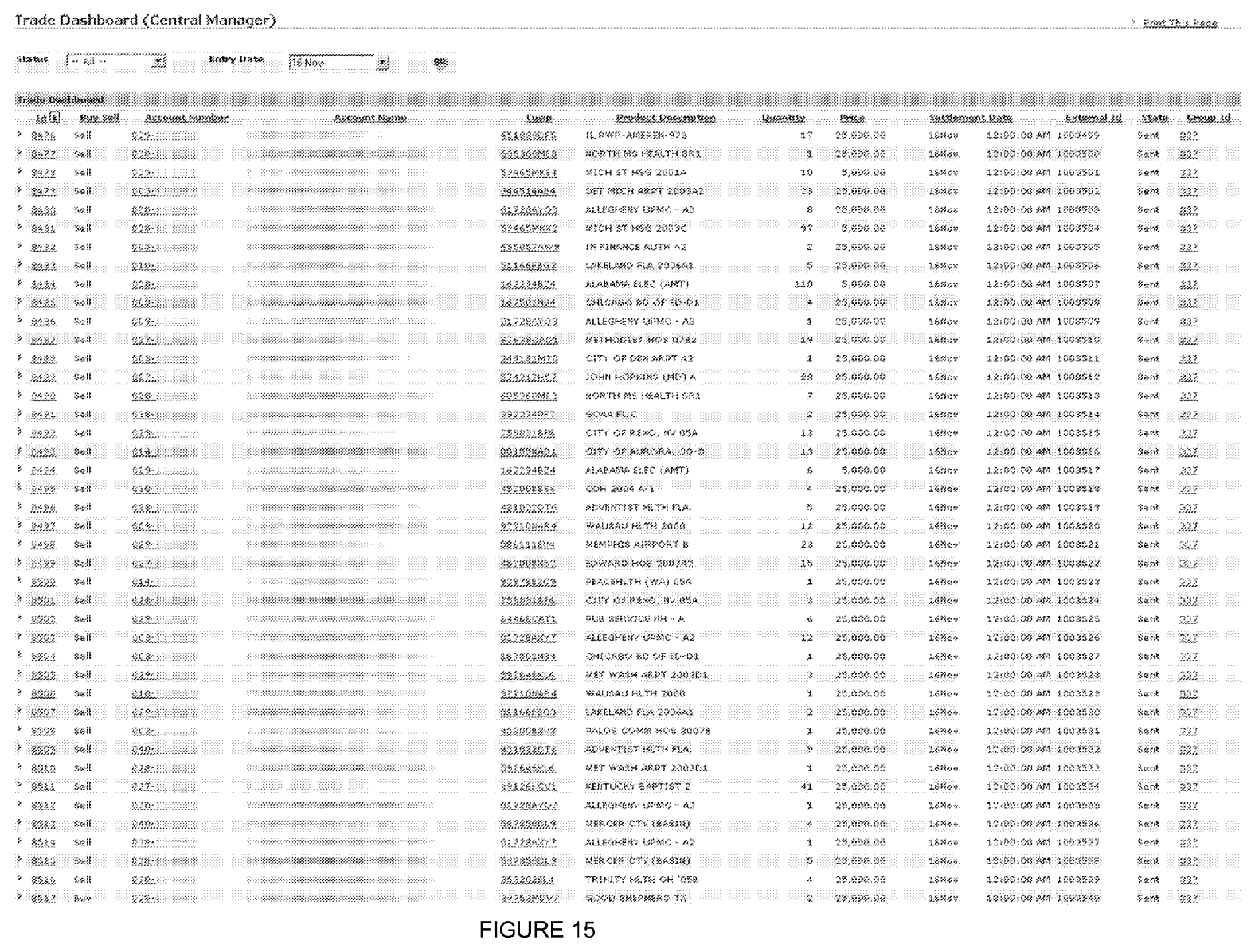

FIG. 15 is an example screen image illustrating aspects of a trade dashboard user interface for an embodiment of the OPTIMIZER. The trade dashboard interface may provide a detailed list of every trade sent to the FICC PARS system.

Figure 16:
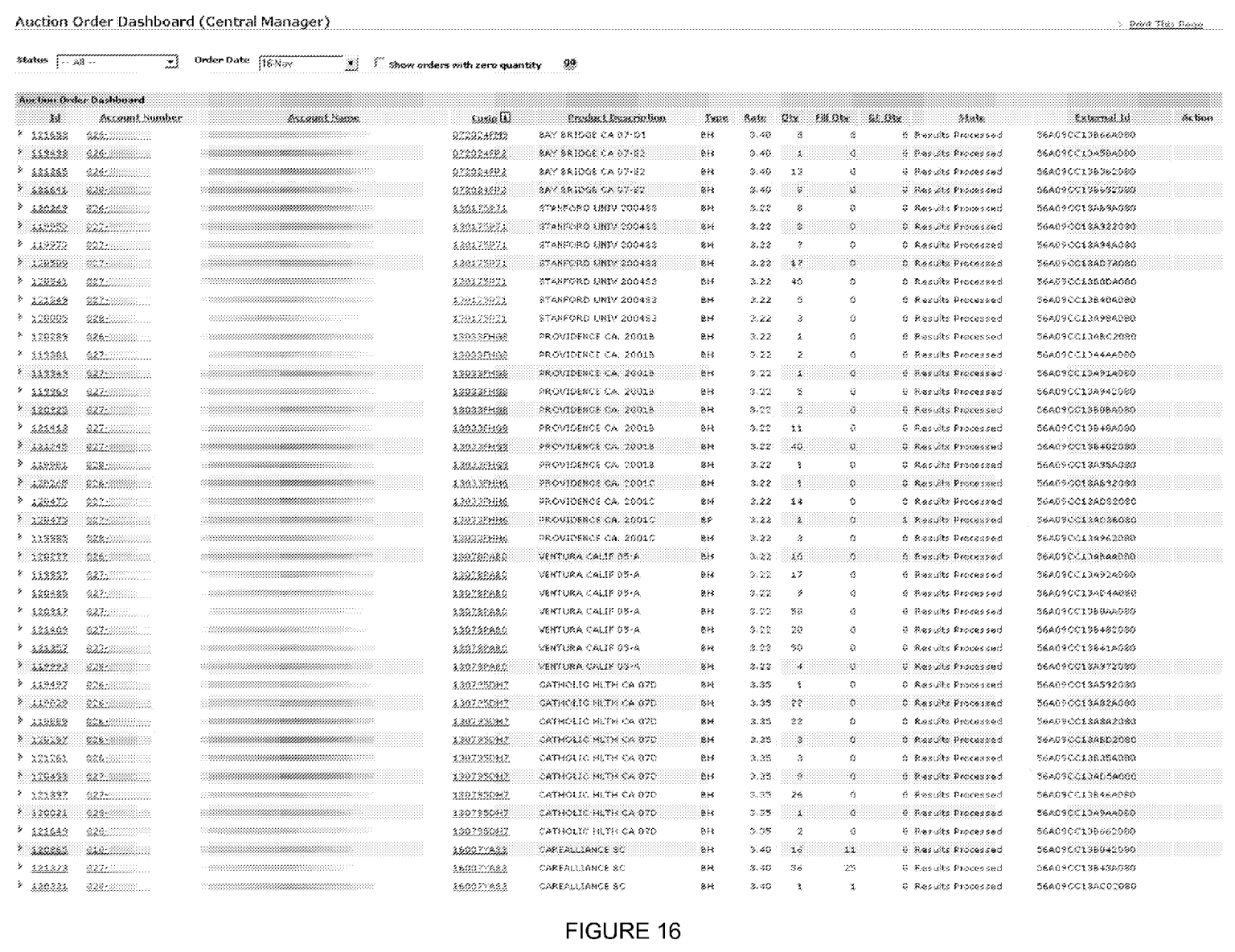

FIG. 16 is an example screen image illustrating aspects of an auction order dashboard user interface for an embodiment of the OPTIMIZER. The auction order dashboard interface may provide a detailed list of every auction order sent to the FICC PARS system.

Figure 17:
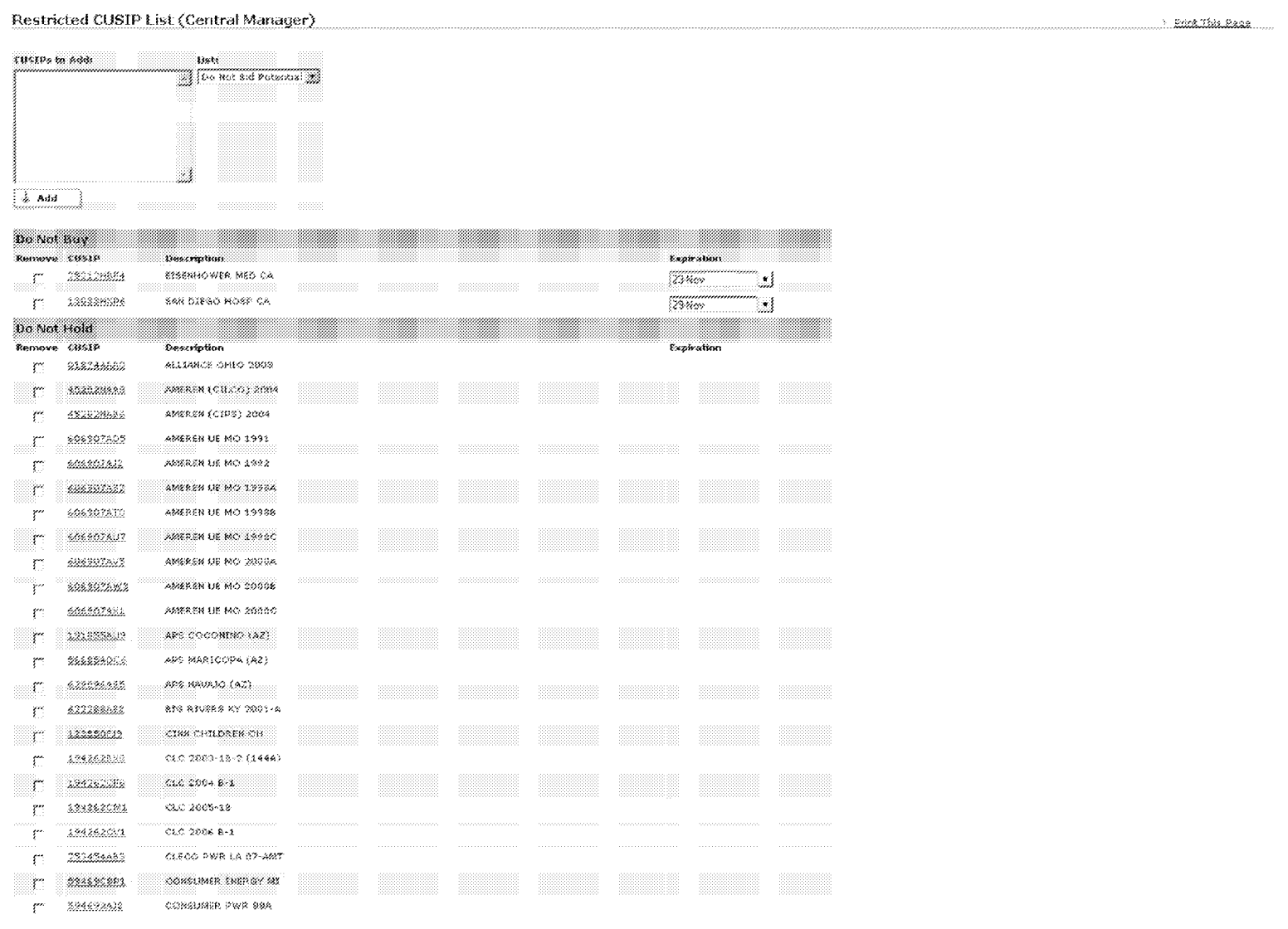

FIG. 17 is an example screen image illustrating aspects of a restricted CUSIP list user interface for an embodiment of the OPTIMIZER. The restricted CUSIP list interface may be used by a sales trader to maintain various product restriction lists, including but not limited to a Do Not Hold list, Do Not Buy list, Do Not Bid Potential list, and/or the like.

Auction Rate Specification

In one embodiment of the OPTIMIZER, rates on BH (Bid-To-Hold) or BP (Bid-Potential) auction orders in the Central PARS system may be set from 3 different sources: product/price-talk guidance (e.g., via the auction calendar interface discussed in FIG. 11), sweep rate guidance (e.g., via the sweep rate spread interface of FIG. 10), and/or manually entered on orders (e.g., via the auction orders interface of FIG. 12). In one embodiment, a maximum of the rate specified by product/price-talk guidance and sweep rate guidance is chosen as the final rate on BH and BP orders. These rates may also be overridden manually for each individual order on the auction order interface (FIG. 12). In one implementation, if either the product/price-talk guidance or sweep rate guidance is updated after this is done, the resulting rate may override the rate that was manually set.

Product/Price-Talk Guidance Calculation

In one embodiment, a sales trader may specify a rate for each product auctioning that day. This may be accomplished based on a price talk feed which may be loaded in the morning daily. The rates may be set in bulk by specifying a rate X bps above/below price talk high/low. The product guidance may also specify the share allocation for BH orders. In one embodiment, the two options may be all shares for all accounts or min. denom in one random account. For all shares for all accounts, a BH order will be created for all shares in the account's position, if that position is greater or equal to the min denom for the product. For min denom in one random account, if the "min. denom" option is picked, one account that has a position equal to at least min. denom would be chosen at random to submit a min. denom-size BH order at auction, and all other accounts may hold their shares. The allocation may be continuously monitored to make sure that the min. denom BH order is still present. In some implementations, the BH may get cancelled if the chosen account needs to sell all of its shares due to a redemption, and a new account may be picked at random to submit the min. denom BH order. In some embodiments, for the BH, account specific drill-down may be allowed. For example, if there is one CUSIP in ten different accounts, ten BH and BP may be placed for each individual account.

Sweep Rate Guidance Calculation

In one implementation, a spread is specified by a sales trader in a three-dimensional matrix (e.g., via the sweep rate spread interface of FIG. 10). The three dimensions may be sweep vehicle rating (e.g., AAA or Non-AAA), issue state (e.g., CA/MA/NY/NJ/NT), and product mode (e.g., Daily/Weekly/Monthly). The rate may be calculated by finding the spread in the matrix based on the product parameters and the account sweep vehicle parameters and then adding it to the before-negative-wealth-impactor sweep rate (for negative-wealth-impactor-vulnerable products) or the post-negative-wealth-impactor sweep rate (for negative-wealth-impactor-exempt products).

Optimizer Controller

Figure 18:
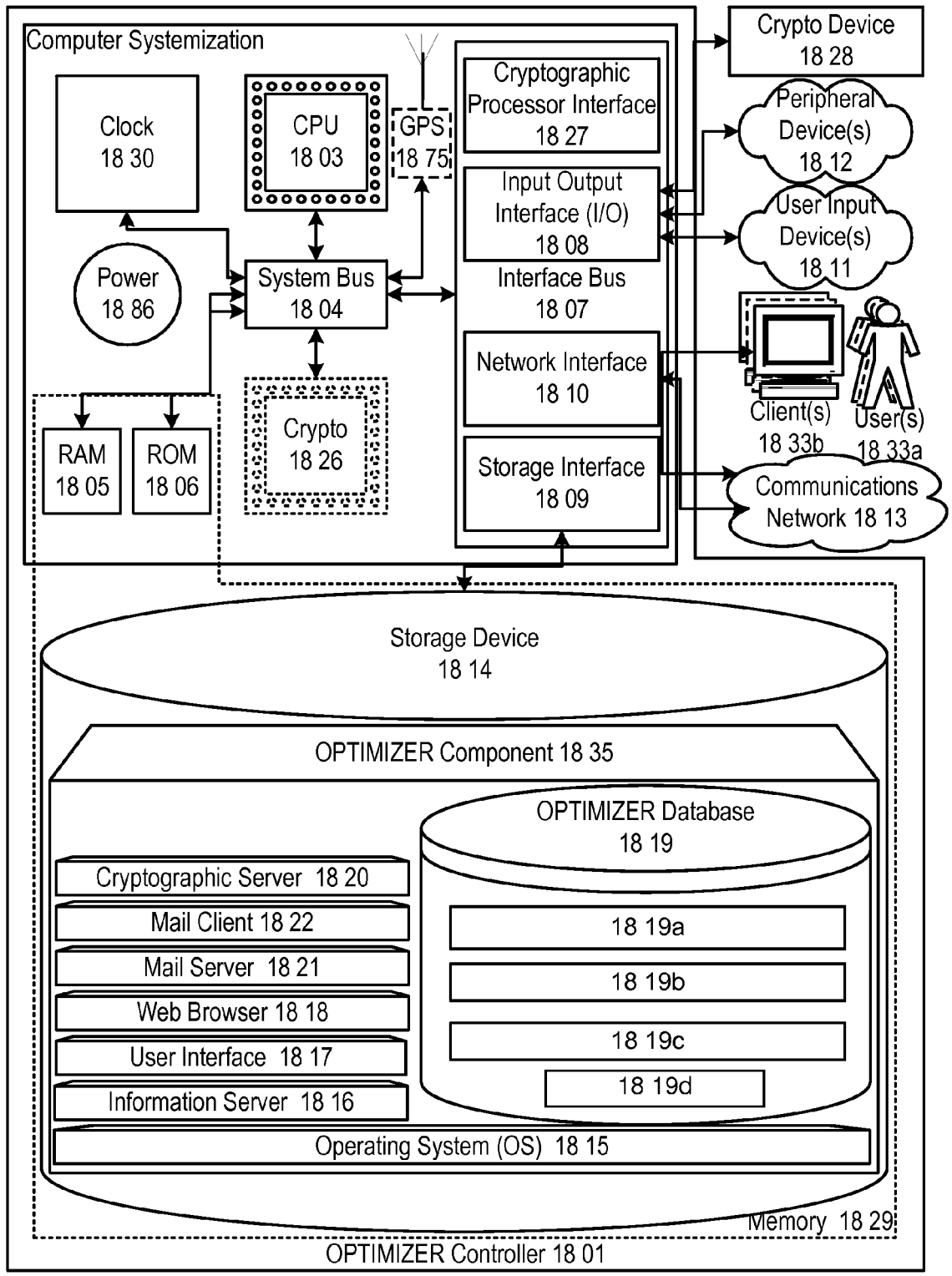
FIG. 18 is of a block diagram illustrating embodiments of the present invention of an OPTIMIZER controller; and APPENDICES 1-4 detail additional aspects of the OPTIMIZER.

FIG. 18 of the present disclosure illustrates inventive aspects of a OPTIMIZER controller 1801 in a block diagram. In this embodiment, the OPTIMIZER controller 1801 may serve to aggregate, process, store, search, serve, identify, instruct, generate, match, and/or facilitate interactions with a computer through various technologies, and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the OPTIMIZER controller 1801 may be connected to and/or communicate with entities such as, but not limited to: one or more users from user input devices 1811; peripheral devices 1812; a cryptographic processor device 1828; and/or a communications network 1813.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The OPTIMIZER controller 1801 may be based on common computer systems that may comprise, but are not limited to, components such as: a computer systemization 1802 connected to memory 1829.

Computer Systemization

A computer systemization 1802 may comprise a clock 1830, central processing unit (CPU) 1803, a read only memory (ROM) 1806, a random access memory (RAM) 1805, and/or an interface bus 1807, and most frequently, although not necessarily, are all interconnected and/or communicating through a system bus 1804. Optionally, the computer systemization may be connected to an internal power source 1886. Optionally, a cryptographic processor 1826 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the OPTIMIZER controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 1886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1886 is connected to at least one of the interconnected subsequent components of the OPTIMIZER thereby providing an electric current to all subsequent components. In one example, the power source 1886 is connected to the system bus component 1804. In an alternative embodiment, an outside power source 1886 is provided through a connection across the I/O 1808 interface. For example, a USB and/or IEEE 1394 connection carries both data and power across the connection and is therefore a suitable source of power.

Interface Adapters

Interface bus(ses) 1807 may accept, connect, and/or communicate to a number of interface adapters, conventionally although not necessarily in the form of adapter cards, such as but not limited to: input output interfaces (I/O) 1808, storage interfaces 1809, network interfaces 1810, and/or the like. Optionally, cryptographic processor interfaces 1827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1809 may accept, communicate, and/or connect to a number of storage devices such as, but not limited to: storage devices 1814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1810 may accept, communicate, and/or connect to a communications network 1813. Through a communications network 113, the OPTIMIZER controller is accessible through remote clients 1833b (e.g., computers with web browsers) by users 1833a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1810 may be used to engage with various communications network types 1813. For example, multiple network interfaces may be employed to allow for the communication over broadcast, multicast, and/or unicast networks.

Input Output interfaces (I/O) 1808 may accept, communicate, and/or connect to user input devices 1811, peripheral devices 1812, cryptographic processor devices 1828, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 1811 may be card readers, dongles, finger print readers, gloves, graphics tablets, joysticks, keyboards, mouse (mice), remote controls, retina readers, trackballs, trackpads, and/or the like.

Peripheral devices 1812 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the OPTIMIZER controller may be embodied as an embedded, dedicated, and/or monitor-less (i.e., headless) device, wherein access would be provided over a network interface connection.

Cryptographic units such as, but not limited to, microcontrollers, processors 1826, interfaces 1827, and/or devices 1828 may be attached, and/or communicate with the OPTIMIZER controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 1829. However, memory is a fungible technology and resource, thus, any number of memory embodiments may be employed in lieu of or in concert with one another. It is to be understood that the OPTIMIZER controller and/or a computer systemization may employ various forms of memory 1829. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1829 will include ROM 1806, RAM 1805, and a storage device 1814. A storage device 1814 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 1829 may contain a collection of program and/or database components and/or data such as, but not limited to: operating system component(s) 1815 (operating system); information server component(s) 1816 (information server); user interface component(s) 1817 (user interface); Web browser component(s) 1818 (Web browser); database(s) 1819; mail server component(s) 1821; mail client component(s) 1822; cryptographic server component(s) 1820 (cryptographic server); the OPTIMIZER component(s) 1835; and/or the like (i.e., collectively a component collection). These components may be stored and accessed from the storage devices and/or from storage devices accessible through an interface bus. Although non-conventional program components such as those in the component collection, typically, are stored in a local storage device 1814, they may also be loaded and/or stored in memory such as: peripheral devices, RAM, remote storage facilities through a communications network, ROM, various forms of memory, and/or the like.

Operating System

The operating system component 1815 is an executable program component facilitating the operation of the OPTIMIZER controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the OPTIMIZER controller to communicate with other entities through a communications network 1813. Various communication protocols may be used by the OPTIMIZER controller as a subcarrier transport mechanism for interaction, such as, but not limited to: multicast, TCP/IP, UDP, unicast, and/or the like.

Information Server

An information server component 1816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the OPTIMIZER controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the OPTIMIZER database 1819, operating systems, other program components, user interfaces, Web browsers, and/or the like.

Access to the OPTIMIZER database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the OPTIMIZER. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the OPTIMIZER as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NTVista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 1817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1818 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the OPTIMIZER enabled nodes. The combined application may be nugatory on systems employing standard Web browsers.

Mail Server

A mail server component 1821 is a stored program component that is executed by a CPU 1803. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the OPTIMIZER.

Access to the OPTIMIZER mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1822 is a stored program component that is executed by a CPU 1803. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1820 is a stored program component that is executed by a CPU 1803, cryptographic processor 1826, cryptographic processor interface 1827, cryptographic processor device 1828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the OPTIMIZER may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the OPTIMIZER component to engage in secure transactions if so desired. The cryptographic component facilitates the secure accessing of resources on the OPTIMIZER and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The OPTIMIZER Database

The OPTIMIZER database component 1819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the OPTIMIZER database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the OPTIMIZER database is implemented as a data-structure, the use of the OPTIMIZER database 1819 may be integrated into another component such as the OPTIMIZER component 1835. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1819 includes several tables 1819*a-c*. An accounts table 1819*a* includes fields such as, but not limited to: account_id, user_data, account_data, position_data, product_data, market_data, tracking_data, financial_data, reporting_data, historical_data, profile_data, account input data, parameter_data, and/or the like. The accounts table may support and/or track multiple entity accounts on a OPTIMIZER; A rules table 1819*b* includes fields such as, but not limited to: rule_id, rule_data, action_data, rule_type, action_type, buy_data, sell_data, settle_data, categories_data, and/or the like; A system table 1819c includes fields such as, but not limited to: system_id, test_data, analysis_data, interface_data, sweep_data, auction_data, rate_data, liquidity_data, restriction_data, system_data, decision_data, and/or the like; and A market table 1819d includes fields such as, but not limited to: equity_id, equity_symbol, equity_price, equity_bid, equity_ask, and/or the like.

In one embodiment, the OPTIMIZER database may interact with other database systems. For example, employing a distributed database system, queries and data access by search OPTIMIZER component may treat the combination of the OPTIMIZER database, an integrated data security layer database as a single database entity.

In one embodiment, user programs may contain various user interface primitives, which may serve to update the OPTIMIZER. Also, various accounts may require custom database tables depending upon the environments and the types of clients the OPTIMIZER may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1819a-c. The OPTIMIZER may be configured to keep track of various settings, inputs, and parameters via database controllers.

The OPTIMIZER database may communicate to and/or with other components in a component collection, including itself, and/or facilities of the like. Most frequently, the OPTIMIZER database communicates with the OPTIMIZER component, other program components, and/or the like. The database may contain, retain, and provide information regarding other nodes and data.

The OPTIMIZERs

The OPTIMIZER component 1835 is a stored program component that is executed by a CPU. In one embodiment, the OPTIMIZER component incorporates any and/or all combinations of the aspects of the OPTIMIZER that was discussed in the previous figures. As such, the OPTIMIZER affects accessing, obtaining and the provision of information, services, transactions, and/or the like across various communications networks.

The OPTIMIZER component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the OPTIMIZER server employs a cryptographic server to encrypt and decrypt communications. The OPTIMIZER component may communicate to and/or with other components in a component collection, including itself, and/or facilities of the like. Most frequently, the OPTIMIZER component communicates with the OPTIMIZER database, operating systems, other program components, and/or the like. The OPTIMIZER may contain, communicate, generate, obtain, and/or provide program component, system, user, and/or data communications, requests, and/or responses.

Distributed OPTIMIZERs

The structure and/or operation of any of the OPTIMIZER node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data processing techniques. Furthermore, single instances may also be distributed across multiple controllers and/or storage devices; e.g., databases. All program component instances and controllers working in concert may do so through standard data processing communication techniques.

The configuration of the OPTIMIZER controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. Again, the desired configuration will depend upon the context, environment, and requirements of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. An optimization processor-implemented method for enabling Periodic Auction Reset Securities (PARS) position maintenance, comprising:

receiving, at an optimization processor, an account maintenance request for an at least one PARS account;
querying at least one account profile database based on the received account maintenance request to identify at least one account profile associated with the at least one PARS account;
retrieving the identified at least one account profile from the at least one account profile database;
analyzing, on the optimization processor, the retrieved account profile to identify at least one account optimization rule that is applicable to the at least one PARS account;
determining, on the optimization processor, whether a violation of the at least one account optimization rule exists in the account profile;
creating an exception in the account profile if the optimization processor determines a violation of the at least one account optimization rule exists in the account profile;
determining at least one action type that can resolve the exception;
executing at least one action corresponding to the at least one action type to resolve the exception; and
updating the account profile.

2. The optimization processor-implemented method of claim 1, wherein the account profile includes an indication of products allowed in the account.

3. The optimization processor-implemented method of claim 1, wherein the account profile includes an indication of products excluded from the account.

4. The optimization processor-implemented method of claim 1, wherein the account profile includes an indication of allocation requirements for the account.

5. The optimization processor-implemented method of claim 1, wherein the at least one applicable account optimization rule is an account validation rule.

6. The optimization processor-implemented method of claim 1, wherein the at least one applicable account optimization rule is an action validation rule.

7. The optimization processor-implemented method of claim 1, wherein the at least one action type is a settlement type and the corresponding at least one action is settlement.

8. The optimization processor-implemented method of claim 1, wherein the at least one applicable account optimization rule includes an associated score.

9. The optimization processor-implemented method of claim 8, wherein a created exception has an associated severity and the severity of the exception corresponds to the score associated with the at least one optimization rule violated.

10. The optimization processor-implemented method of claim 8 wherein the determination and identification of the at least one action type is based on minimizing a total score of exceptions in the account profile.

11. The optimization processor-implemented method of claim 1, wherein the at least one action is an inventory buy action.

12. The optimization processor-implemented method of claim 1, wherein the at least one action is an inventory swap action.

13. The optimization processor-implemented method of claim 1, wherein the at least one action is a cross action.

14. The optimization processor-implemented method of claim 1, wherein the at least one action is a client swap action.

15. The optimization processor-implemented method of claim 1, wherein the at least one action is an auction action.

16. The optimization processor-implemented method of claim 15, wherein the auction action is a bid potential order.

17. The optimization processor-implemented method of claim 15, wherein the auction action is a sell auction order.

18. A Periodic Auction Reset Securities (PARS) position maintenance apparatus, comprising:
- a processor;
- a memory in communication with the processor and containing program modules executable by the processor, wherein the program modules, when executed by the processor, cause the processor to:
  - receive an account maintenance request over a network for an at least one PARS account;
  - query at least one account profile database based on the received account maintenance request to identify at least one account profile associated with the at least one PARS account;
  - retrieve the identified at least one account profile from the at least one account profile database,
  - analyze the retrieved account profile to identify at least one account optimization rule that is applicable to the at least one PARS account;
  - determine whether a violation of the at least one account optimization rule exists in the account profile;
  - create an exception in the account profile if a violation of the at least one account optimization rule exists in the account profile,
  - determine an at least one action type that can resolve the exception;
  - execute at least one action corresponding to the at least one action type to resolve the exception; and
  - update the account profile.

19. A Periodic Auction Reset Securities (PARS) position maintenance system, comprising:
- means for receiving an account maintenance request over a network for an at least one PARS account;
- means for querying at least one account profile database based on the received account maintenance request to identify at least one account profile associated with the at least one PARS account;
- means for retrieving the identified at least one account profile from the at least one account profile database,
- means for analyzing the retrieved account profile to identify an at least one account optimization rule that is applicable to the at least one PARS account;
- means for determining whether a violation of the at least one account optimization rule exists in the account profile;
- means for creating an exception in the account profile if a violation of the at least one account optimization rule exists in the account profile;
- means for determining an at least one action type that can resolve the exception;
- means for executing at least one action corresponding to the at least one action type to resolve the exception; and
- means for updating the account profile.

* * * * *